Aug. 24, 1965  G. A. HUGHES ETAL  3,202,686
PREPARATION OF 13-ALKYLGONA-1,3,5(10),8,14-PENTAENES
Filed April 27, 1964
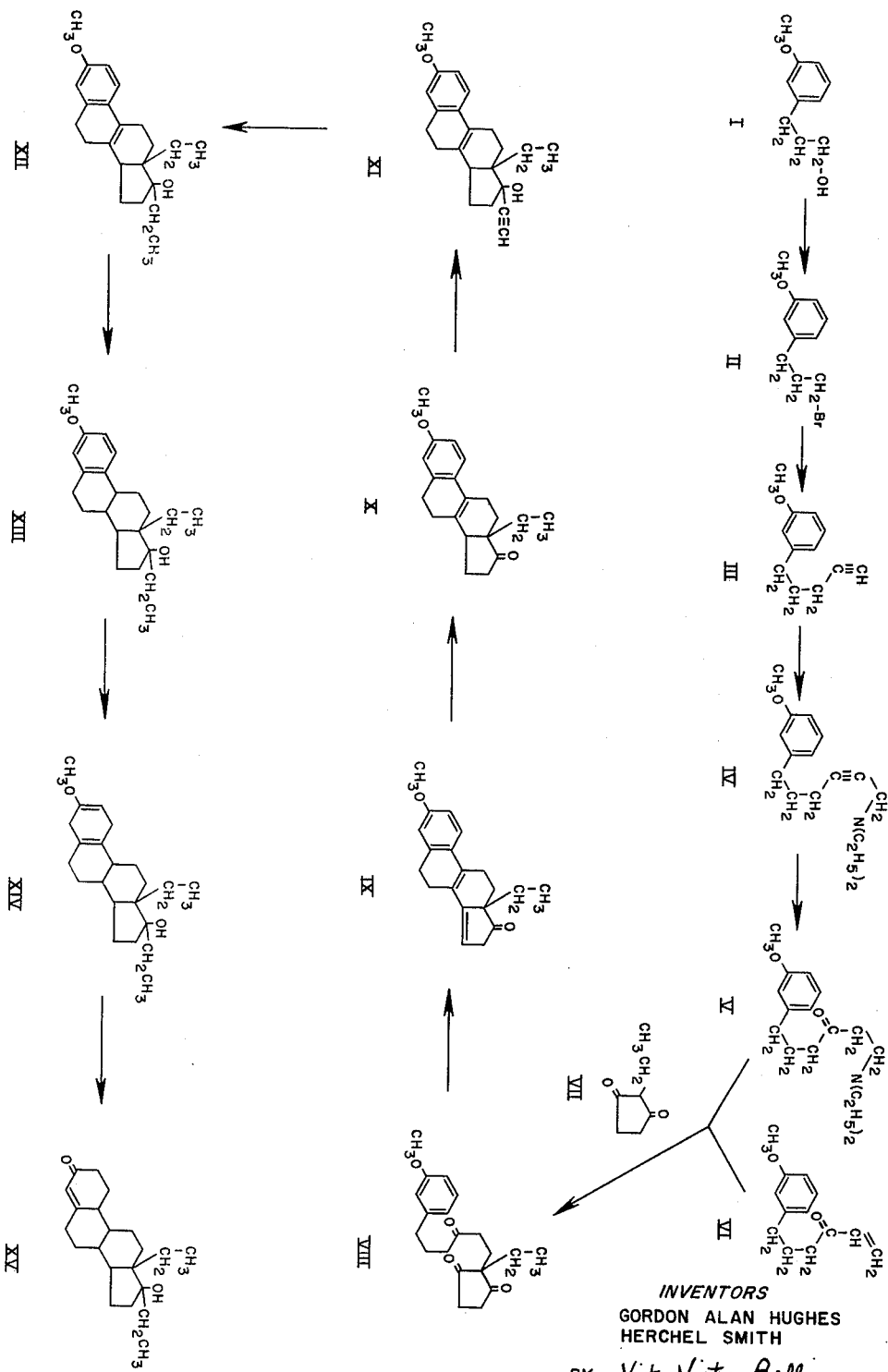
INVENTORS
GORDON ALAN HUGHES
HERCHEL SMITH
BY Vito Victor Bellino
ATTORNEY United States Patent Office 3,202,686
Patented Aug. 24, 1965

3,202,686
PREPARATION OF 13-ALKYLGONA-1,3,5(10),8,14-PENTAENES
Gordon Alan Hughes, 615 Lanmore Ave., and Herchel Smith, 500 Chestnut Lane, both of Wayne, Pa.
Filed Apr. 27, 1964, Ser. No. 362,572
15 Claims. (Cl. 260—397.45)

This application is a continuation-in-part of copending application Serial No. 228,384 filed October 4, 1962, which is a continuation of applications Serial No. 57,904, filed September 23, 1960, now abandoned; Serial No. 91,341, filed February 24, 1961, now abandoned; Serial No. 137,535, filed September 12, 1961, now abandoned; Serial No. 195,000, filed May 15, 1962, now abandoned; and Serial No. 196,557, filed May 16, 1962, now abandoned.

This invention relates to compositions of matter classified in the art of chemistry as substituted unsaturated-gonane derivatives, to intermediates therefor, and to processes for making and using such compositions.

In describing the invention, references will be made in the following specification to the annexed drawings, wherein:

FIGURE 1 illustrates schematically the reaction sequence for preparing a 13-alkylgona-1,3,5(10),8,14-pentaene, specifically 13β - ethyl - 3 - methoxygona - 1,3, 5(10),8,14 - pentaen - 17 - one and using said unsaturated gonane to prepare a 13-alkylgon-4-ene, specifically 13β,17α-diethyl-17β-hydroxygon-4-en-3-one.

The invention sought to be patented in a principal composition aspect is described as residing in the concept of a gona-1,3,5(10),8,14-pentaene nucleus having attached thereto in the 13-position a monovalent polycarbon-alkyl radical (FIGURE 1, IX).

The tangible embodiments of said principal composition aspect possess the use characteristic of exerting varying hormone effects in animals as evidenced by pharmacological evaluation according to standard test procedures including estrogenic and lipid shifting effects. Furthermore, said tangible embodiments of said principal composition aspect possess the use characteristic of being intermediates for the preparation of compositions exerting hormonal effects as evidenced by standard test procedures. Compositions prepared from the principal compositions of the invention show estrogenic, androgenic, anti-estrogenic, progestational, blood lipid effects, and anabolic actions, salt retention, salt excretion and central nervous system effects. This finding indicates their usefulness in the treatment of female hypogonadism, amenorrhea, dysmenorrhea, ovulation block and contraception, functional uterine bleeding, acne, osteoporosis, infertility, pregnancy maintenance, habitual abortion, weight gain and nitrogen retention, growth stimulation, post operative recovery, healing of wounds, and healing of burns. In particular it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

The tangible embodiments of said composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositons sought to be patented.

The invention sought to be patented, in a principal process of making the compositions aspect, is described as residing in the concept of the sequence of reactions including: converting a compound having a 5-phenyl-pent-1-yne nucleus, ring-unsubstituted in at least one position ortho to the point of chain attachment, by means of a Mannich-type reaction, to its acetylenic amine derivative; hydrating the acetylenic linkage to form a 3-keto compound; reacting such 3-keto substrate compound with a nucleophilic 2-monovalent alkyl-1,3-dioxo-cyclopentano compound under Michael condensation conditions to attach the cyclopentano compound through its 2-position carbon atom to the 1-position carbon atom of the 3-keto compound; and treating the bicyclic triketone formed in the preceding step with an acidic dehydrating agent thereby to effect a double cyclodehydration to form a 1,3,5(10),8,14-pentadehydro-13-alkyl-gonane.

The invention sought to be patented in a second composition aspect is described as residing in the concept of a 2 - (6 - phenyl - 3 - oxohexyl) - 1,3 - cyclopentane-dione nucleus having attached thereto in the 2-position a monovalent polycarbon-alkyl radical (FIGURE 1, VIII).

The tangible embodiments of said second composition aspect possess the applied use characteristic of being intermediates for the preparation of compositions exerting hormonal effects as evidenced by standard test procedures.

The invention sought to be patented in a third composition aspect is described as residing in the concept of a compound having a dialkylamino-6-phenyl-2-hexyne nucleus (FIGURE 1, IV).

The tangible embodiments of said third composition aspect possess the use characteristic of being intermediates for the preparation of compositions which possess the use characteristic of exerting hormonal effects with unexpected separation of activity as evidenced by standard test procedures.

The invention sought to be patented in a fourth composition aspect is described as residing in the concept of a compound having a dialkylamino-6-phenyl-3-hexanone nucleus (FIGURE 1, V).

The tangible embodiments of said fourth composition aspect possess the use characteristic of being intermediates for the preparation of compositions which possess the use characteristic of exerting hormonal effects with unexpected separation of activity as evidenced by standard test procedures.

The invention sought to be patented in a fifth composition aspect is described as residing in the concept of a compound having a 6-phenyl-1-hexen-3-one nucleus (FIGURE 1, VI).

The tangible embodiments of said fifth composition aspect possess the use characteristic of being intermediates for the preparation of compositions which possess the use characteristic of exerting hormonal effects with unexpected separation of activity as evidenced by standard test procedures.

The invention sought to be patented in a sixth composition aspect is described as residing in the concept of a compound having a 2-polycarbonalkyl-1,3-cyclopentane-dione nucleus (FIGURE 1, VII).

The tangible embodiments of said sixth composition aspect possess the use characteristic of being intermediates for the preparation of compositions which possess the use characteristic of exerting hormonal effects with unexpected separation of activity as evidenced by standard test procedures.

The invention sought to be patented in a second process aspect is described as residing in the concept of reacting a compound having a 6-phenyl-1-hexen-3-one nucleus unsubstituted in the 1-position (FIGURE 1, VI), or, alternatively, reacting a compound having a 6-phenyl-3-hexanone nucleus to which is attached at the 1-position a group which will eliminate with hydrogen under Michael conditions (FIGURE 1, V), with a nucleophilic compound having a 1,3-dioxocyclopentano nucleus which has at least one hydrogen in the 2-position, under Michael condensation, to attach the cyclopentano-compound nucleus through its 2-position carbon to the 1-position carbon atom of the 3-keto compound nucleus, thereby to form a 2-(6-phenyl-3-oxohexyl)-1,3-cyclopentanedione (FIGURE 1, VIII).

The invention sought to be patented in a third process aspect is described as residing in the concept of treating a compound having a 2-(6-phenyl-3-oxohexyl)-1,3-cyclopentanedione nucleus which has an ortho-para directing substituent (FIGURE 1, VIII), with catalytic amounts of a suitable dehydrating acid, such as polyphosphoric or p-toluene sulfonic acid, under conditions which result in the removal of water to form a tetracyclic compound (FIGURE 1, IX).

The manner and process of making and using the invention will now be generally described so as to enable a person skilled in the art of chemistry to make and use the same, as follows:

Referring now to FIGURE 1, wherein the compounds are assigned Roman numerals for identification schematically, the sequence of reactions involved in the synthesis of a specific embodiment, namely 13$\beta$-ethyl-3-methoxygona-1,3,5(10),8,14-pentaen-17-one, and the sequence of reactions involved in the use of said unsaturated gonane to prepare a 13-alkylgon-4-ene, specifically, 13$\beta$,17$\alpha$-diethyl-17$\beta$-hydroxy-gon-4-en-3-one, is illustrated. 3-(m-methoxyphenyl)propanol (I) is heated with phosphorus tribromide in benzene after dropwise addition in the cold to form 3-(m-methoxyphenyl)propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxane, and cuprous chloride at 70° C. for about 12 hours, whereby there is obtained 1-diethylamino-6-(m-methoxyphenyl)-2-hexyne (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI), or mixtures thereof, is then reacted with 2-ethyl-1,3-cyclopentanedione (VII) under Michael condensation conditions, e.g. refluxing in methanolic potassium hydroxide to form 2-ethyl-2-[6-(m-methoxyphenyl)-3-oxohexyl]-1,3-cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13$\beta$-ethyl-3-methoxygona-1,3,5(10),8,14-pentaen-17-one (IX). To use compound the 14-unsaturation of Compound IX is then selectively hydrogenated in the presence of a metal catalyst, such as 2% palladized calcium carbonate, to form 13$\beta$-ethyl-3-methoxygona-1,3,5(10),8-tetraen-17-one (X). Ethynylation at the 17-position of Compound X with lithium acetylide in dimethylacetamide gives 13$\beta$-ethyl-17$\alpha$-ethynyl-3-methoxygona-1,3,5(10),8-tetraen-17$\beta$-ol (XI). The ethynyl group of Compound XI is then selectively hydrogenated to ethyl, as in the presence of a supported palladium catalyst, to produce 13$\beta$,17$\alpha$-diethyl-3-methoxygona-1,3,5(10),8-tetraen-17$\beta$-ol (XII), which is then converted to 13$\beta$,17$\alpha$-diethyl-3-methoxygona-1,3,5(10)-trien-17$\beta$-ol (XIII) by alkali metal reduction in liquid ammonia, to provide the normal gonane configuration of 9,8–8,14–14,13 exocyclic substituents, namely, trans-anti-trans.

By alkali metal reduction in liquid ammonia in the presence of a proton donor, such as ethanol (Birch reduction), Compound XIII is converted to 13$\beta$,17$\alpha$-diethyl-3-methoxy-gona-2,5(10)-dien-17$\beta$-ol (XIV). By hydrolysis in the presence of mineral acid, Compound XIV is then converted to 13$\beta$,17$\alpha$-diethyl-17$\beta$-hydroxygon-4-en-3-one (XV).

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael condensation step is 2-methyl-1,3-cyclopentanedione.

The aromatic ring of the phenylpropanol (FIGURE 1, I) used as the starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referring to electrophilic aromatic substitution) such as hydroxy, acyloxy, alkoxy, amino, alkylamino, or acylamino is a necessary substituent on the aromatic ring. The group may be present initially or may be introduced later but before ring closure, either directly or by conversion from a meta-directing group such as nitro. After the tetracyclic structure has been formed, substituents can be introduced into the aromatic A-ring which are not limited as above; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy, alkylenethioxy, and alkylenedithio; or groups introducible by known processes, such as halogen or alkyl. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. Moreover, this atom, to which the phenyl group is attached in Compound I, need not necessarily be carbon. It can be a hetero atom which would not interfere with subsequent catalytic reductions, as, for example, oxygen or nitrogen. This atom will appear in the tetracyclic structures of the invention in the 6-position, and it will be apparent, may be, as in the case of the nitrogen, substituted with hydrogen or an alkyl group.

The 2-carbon atom of the starting phenyl-propanol (I) can also be substituted, as, for example, with an alkyl group, such as methyl and ethyl, and, as such, be unchanged throughout the subsequent synthesis. In the tetracyclic structures of the invention this carbon atom will appear in the 7-position.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to form the Michael product. The nucleophilic compound can be a carbocyclic-1,3-dione of varying ring size, as, for example, a five-membered ring, a six-membered ring, etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acylic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other.

When the nucleophilic compound is 2-methyl-1,3-cyclopentanedione, the invention provides a unique total synthesis for natural steroids: the hydrogens at the 8-position, 9-position, and 14-position being $\beta$, $\alpha$, and $\alpha$, respectively, as in the natural steroids. Thus such valuable therapeutic substances as estrone, estradiol, and 19-nortestosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralkyl, cycloalkylalkyl, or a polycarbonalkylene bridge bearing a hydroxy-, amino-, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbon-alkyl substituents, having physiological activity of the same type.

In any of the intermediate structures or in the tetracyclic structures of the invention having either an aromatic, partially reduced, or totally reduced A-ring wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group so formed; to alkoxymethylene by etherification to the hydroxymethylene group; to alkylhydroxymethylene by addition of the appropriate organo-metallic reagent to the carbonyl; or to alkynylhydroxymethylene by addition of the appropriate alkali metal acetylide in a suitable inert solvent; all in the known manner. The carbonyl group may also be ketalized or thioketalized by treating with the appropriate alcohol or glycol in a suitable solvent under acidic conditions, as in the presence of an acid such as sulfuric acid, p-toluene sulfonic acid, or boron trifluoride etherate, with heating where necessary, according to the known art.

The specific reactions involved in the processes of the invention will now be considered, as follows, reference being made to the drawings for typifying compounds:

The vinyl ketones (VI) of the invention are prepared by elimination of dialkylamine from the corresponding dialkylaminoethyl aminoketones (V), obtained by hydration of the acetylenic linkage in an acetylenic amine (IV). The acetylenic amines (IV) can be themselves prepared by a Mannich reaction from the corresponding acetylene (III) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl compound, followed by hydration, or by quaternization of the ketoamine. The vinyl ketones can be prepared from these derivatives by the above elimination reaction. Thus the ketoamine or its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketones derivative employed is a keto-amine and dialkylamine is eliminated in the reaction, no added base may be required. Where the compound is a 2-alkylcyclopentane-1,3-dione (VIII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete.

The selective hydrogenation of the gona-1,3,5(10),8,14-pentaenes typified by Compound IX is carried out by means of 2% palladized calcium carbonate. As hereinbefore noted, surprisingly, the catalytic hydrogenation results in addition of hydrogen to the 14-double bond in such a way as to give the "natural" stereochemical configuration; that is, the hydrogen adds at 14-trans to the alkyl at 13. Selective reduction of the 14-ethylenic linkage is achieved by use of catalyst-solvent combination which shows adequate selectivity, and stopping the hydrogenation when the theoretical amount of hydrogen has reacted. Solvents showing selectivity in this regard are the nonprotonic solvents, that is, hydrocarbons and ethers; benzene, toluene, naphtha, dioxan, dibutyl ether, and diethyl ether are examples of suitable nonprotonic solvents. On the other hand, protonic solvents such as acetic acid and ethanol appear to be largely non-selective.

It has been found that a moderately active Raney nickel catalyst provides good selectivity in a suitable solvent. If a Raney nickel catalyst of low activity is employed, the hydrogenation may be too slow to be useful; on the other hand, a vigorous catalyst shows poor selectivity, and some saturation of the 8,9-ethylenic bond may occur simultaneously with the hydrogenation at the 14,15-position.

If desired, other moderately active hydrogenation catalysts may be used instead of Raney nickel; for example, palladium on barium sulfate or on an alkaline earth metal carbonate or on charcoal have all been found suitable in this selective hydrogenation.

Saturation at the 8- or at the 9(11)-position of the tetracyclic structures must be stereospecific to obtain the natural type of exocyclic substituent configuration as noted supra. Such a sufficiently stereospecific reduction can be in general effected by the action of an alkali metal (sodium, potassium, or lithium) in liquid ammonia to give the normal steroid configuration hydrogen at the respective carbons. Preferably this type of reduction is carried out in the presence of a primary or secondary aromatic amine, for instance aniline, p-toluidine, or diphenylamine, as this can improve the yield of the desired product. The reduction can also be carried out in the presence of a more reactive proton donor: in this instance, the reduction of the ethylenic linkage occurs with a simultaneous reduction of the aromatic ring to give a 1,4-dihydrophenyl group.

The reduction of 9(11)-dehydro compounds can also be effected by catalytic hydrogenation, as this has been discovered to be sufficiently stereospecific for production of the desired trans-anti-trans compounds of normal configuration.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph.

For preparing pharmaceutical compounds from the physiologically active compounds of this invention pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulations including sustained-release agents.

The following preparations illustrate the manner of making the chemical compounds which are the starting materials for use in the processes of the invention.

PREPARATION 1.—4,4-ETHYLENEDIOXY-4-m-NITROPHENYLBUTYRIC ACID GLYCOL MONOESTER

Add a solution of 3-(m-nitrobenzoyl)propionic acid (140 g.) (Martin, J. Amer. Chem. Soc., 1936, 58, 1441) in benzene to toluene-p-sulphonic acid (50 g.) and an excess of ethylene glycol. Reflux for 20 hours with removal of water in a Dean-Stark apparatus. Wash the cooled mixture with water and avaporate the solvent under reduced pressure, to obtain as a gum the crude ethylene glycol monoester of 4,4-ethylenedioxy-4-m-nitrophenylbutyric acid.

PREPARATION 2.—4,4-ETHYLENEDIOXY-4-m-NITROPHENYLBUTYRIC ACID

Mix the ketal ester of Preparation 1 with an equal volume of ethanol to make it mobile, and add the solution rapidly to a refluxing solution of sodium hydroxide (50 g.) in water (200 cc.). After 3 minutes cool and pour the mixture into excess dilute acetic acid with shaking. Allow the ketal acid, 4,4-ethylenedioxy-4-m-nitrophenylbutyric acid, to precipitate as a yellow granular powder and filter off (150 g.).

PREPARATION 3.—4-m-AMINOPHENYL-4,4-ETHYLENEDIOXYBUTYRIC ACID

Shake the nitro ketal acid of Preparation 2 (50 g.) in methanol (500 cc.) with platinum oxide catalyst (1.5 g.) in hydrogen at atmospheric pressure until hydrogenation ceases (1 hour). Remove the catalyst and evaporate the solvent under reduced pressure to obtain 4-m-aminophenyl-4,4-ethylenedioxybutyric acid as pale yellow fine needles (43 g.).

PREPARATION 4.—4-m-NITROPHENYLBUTYRIC ACID

Dissolve amino ketal acid of Preparation 3 (43 g.) in liquid ammonia (1 liter), add sodium (12 g.) in pieces, and stir the mixture until all the sodium dissolves and the blue color is discharged. Add ammonium chloride (19 g.) to dissolve the precipitate, and more sodium (8 g.). Complete removal of the ketal group is marked by a permanent blue color. Add more ammonium chloride (19 g.), evaporate and extract the solid residue with ethanol. Filter and evaporate, and then extract, filter and evaporate again to obtain crude sodium 4-m-aminophenylbutyrate. Heat on a steam bath for 6 hours at 0.05 mm. pressure to remove most of the ethylene glycol present. Shake the product for several hours in chloroform with toluene-p-sulphonic acid (31 g.), filter the solution, wash the residue with hot chloroform and add the hot chloroform washings to the filtrate. Evaporate the filtrate solvent to obtain crude 4-m-aminophenylbutyric acid as a gum.

Add the crude aminoacid in chloroform (75 cc.) dropwise to a hot solution of peracetic acid in apparatus fitted with a reflux condenser. When the ensuing highly exothermic reaction is complete, pour the chloroform solution into water and then remove the chloroform by steam distillation. On cooling the dark oil obtained partly solidifies. Crystallize from aqueous methanol, treating with charcoal to remove color, to obtain 4-m-nitrophenylbutyric acid, M.P. 125° C.

$C_{10}H_{11}O_4N$ Calculated: C, 57.4%; H, 5.3%. Found: C, 57.9%; H, 5.4%.

PREPARATION 5.—3-m-NITROPHENYLPROPYL BROMIDE

Neutralize the nitroacid of Preparation 4 (9 g.) in ethanol (100 cc.) with N-sodium hydroxide solution. Add a solution of silver nitrate (7.5 g.) in water (20 cc.) with stirring, and filter, wash and dry the silver salt at 110° C.; powder the product dry at 100° C. and 0.05 mm. pressure. Suspend the dried silver salt in dry carbon tetrachloride (125 cc.) and add a solution of bromide (6 g.) in carbon tetrachloride. Reflux the mixture for 3 hours, then filter and evaporate; distil the residue to obtain 3-m-nitrophenylpropyl bromide (5 g.), B.P. 140° C./0.05 mm.

PREPARATION 6.—3-m-HYDROXYPHENYLPROPAN-1-OL

Add m-hydroxyphenylpropionic acid (57 g.) in dry tetrahydrofuran (250 cc.) dropwise into a vigorously stirred suspension of lithium aluminum hydride (20 g.) in tetrahydrofuran (1 liter), at a rate of addition such that gentle refluxing takes place. Reflux the mixture for 6 hours, allow to cool, and stir for 12 hours. Decompose the excess lithium aluminum hydride by careful addition of 50% aqueous ethanol (about 200 cc.), and then add 10% aqueous ethanol (about 200 cc.), and then add 10% aqueous sulfuric acid until the precipitated salts dissolve (ca. 500 cc. acid). Saturate the aqueous layer with salt while stirring, and separate the tetrahydrofuran layer. Wash the resulting aqueous layer with ether. Evaporate the tetrahydrofuran solution under reduced pressure to remove the solvent, take up the residue in ether, and add the other washings to it. Wash the ether solution with saturated potassium bicarbonate, saturated brine, and finally dry over anhydrous magnesium sulfate. Evaporate the solvent, distill the residue under reduced pressure to obtain a liquid, B.P. 130–2°/0.2 mm., which crystallizes on standing, forming colorless waxy crystals of 3-m-hydroxyphenylpropan-1-ol (40 g.), M.P. ca. 30°.

PREPARATION 7.—3-m-HYDROXYPHENYLPROPYLBROMIDE

Heat and stir the hydroxyphenylpropanol of Preparation 6 (10 g.) with 48% aqueous hydrogen bromide solution (5 cc.) under reflux for 3 hours, then add a further quantity of the aqueous acid (4 cc.) and continue refluxing for 12 hours. Cool, add ether (100 cc.) and wash the ether solution with water, aqueous potassium bicarbonate, and saturated brine. Dry the solution over anhydrous magnesium sulfate, remove the ether and distill to obtain 3-m-hydroxyphenylpropyl bromide (10 g.), B.P. 115–7°/0.25 mm., as a colorless viscous liquid.

PREPARATION 8.—METHYL 3-HYDROXY-3-(3-METHOXYPHENYL)BUTANOATE

Add m-methoxy acetophenone (100 g.) in benzene (450 cc.) and methyl bromoacetate (153 g.) dropwise to a mixture of acid washed activated zinc (67 g.), methyl bromoacetate (5 cc.) and a crystal of iodine in benzene (20 cc.) at such a rate that gentle refluxing takes place. After the addition is complete continue refluxing for 1 hour, cool the mixture and pour onto ice and 10% aqueous sulfuric acid. Separate the benzene layer, wash, dry, evaporate the solvent and distil the residue to give after a forerun of reactants methyl 3-hydroxy-3-(3-methoxyphenyl)butanoate, B.P. 140°/0.65 mm. Hg.

PREPARATION 9.—METHYL 3-(3-METHOXYPHENYL)BUTANOATE

Shake methyl 3-hydroxy-3-(3-methoxyphenyl)butanoate (116 g.) in acetic acid (1 liter) with 10% palladized charcoal (20 g. of prehydrogenated) in an atmosphere of hydrogen until uptake of hydrogen virtually ceases (12.5 liters of hydrogen absorbed). Filter off the catalyst, evaporate the solvent and distil the residue to obtain methyl 3-(3-methoxyphenyl)butanoate, B.P. 139–142° at 5 mm. Hg $n_D^{26°}$ 1.5060, 112.4 g.

Infrared absorption peak at $5.75\mu$.

PREPARATION 10.—3-(3-METHYLPHENYL)-BUTAN-1-OL

Add methyl 3-(3-methoxyphenyl)-butanoate (112 g.) in ether (500 cc.) slowly to a stirred suspension of lithium aluminum hydride (40 g.) in ether (500 cc.). Reflux the mixture for 30 minutes, cool and decompose by adding methanol and water. Dissolve the precipitate by adding 10% sulfuric acid, separate the ether layer and extract the aqueous layer with ether. Wash the combined organic extracts with water, dry ($Na_2SO_4$), remove the solvent and distil the residue to obtain 3-(3-methoxyphenyl)-butan-1-ol, B.P. 118–121°/0.4 mm. Hg $n_D^{21}$ 1.5260.

Ultraviolet absorption peaks at 274, 285 m$\mu$ ($\epsilon$ 1800, 1650).

Infrared absorption peaks at 3.05, 6.25$\mu$.

PREPARATION 11.—3-(3-METHOXYPHENYL)-n-BUTYL BROMIDE

Cool 3-(3-methoxyphenyl)butan-1-ol (84 g.) in benzene (125 cc.) to 0° and add a solution of phosphorus tribromide (55 g.) in benzene (100 cc.) dropwise so that the temperature of the mixture does not rise above 5°. Heat the mixture at 60° for 3 hours, cool, pour onto ice, dilute the organic layer with ether and separate it. Wash the organic solution with 3 N aqueous sodium hydroxide, water and dry. Remove the solvent and distil the residue to obtain 3-(3-methoxyphenyl)-n-butyl bromide, 92.8 g., B.P. 100–104° C./0.15 mm.

$C_{11}H_{15}OBr$ Calculated: C, 54.4%; H, 6.23%; Br, 32.85%. Found: C, 54.48%; H, 6.37%; Br, 32.58%.

Infrared absorption peaks at 6.25, 12.66, 11.71$\mu$.

To prepare 3-(3-methoxyphenyl)-n-propyl bromide, treat 3-(3-methoxyphenyl)propan-1-ol with a slight stoichiometric excess of phosphorus tribromide according to the manipulative procedure set forth above.

To prepare 3-(3-ethoxyphenyl)-n-pentyl chloride, treat 3-(3-ethoxyphenyl)pentan-1-ol with a slight stoichiometric excess of phosphorus trichloride according to the manipulative procedure set forth above.

To prepare 3 - (3-methoxy-4-ethoxyphenyl)-n-propyl chloride, treat 3-(3-methoxy-4-ethoxyphenyl)propan-1-ol with a slight stoichiometric excess of phosphorus trichloride according to the manipulative procedure set forth above.

To prepare 3-(3-ethoxyphenyl)-n-butyl bromide, treat 3-(3-ethoxyphenyl)butan-1-ol with a slight stoichiometric excess of phosphorus tribromide according to the manipulative procedure set forth above.

To prepare 3-(3,5-diethoxyphenyl)-n-propyl bromide, treat 3-(3,5-diethoxyphenyl)propan-1-ol with a slight stoichiometric excess of phosphorus tribromide according to the manipulative procedure set forth above.

To prepare 3-(3-propoxyphenyl)-n-propyl chloride, treat 3-(3-propoxyphenyl)propan-1-ol with a slight stoichiometric excess of phosphorus trichloride according to the manipulative procedure set forth above.

To prepare 3-(3-propoxyphenyl)-n-butyl bromide, treat 3-(3-propoxyphenyl)butan-1-ol with a slight stoichiometric excess of phosphorus tribromide according to the manipulative procedure set forth above.

To prepare 3-(3-methoxy-4-propoxyphenyl)-n-propyl chloride, treat 3-(3-methoxy-4-propoxyphenyl)propan-1-ol with a slight stoichiometric excess of phosphorus trichloride according to the manipulative procedure set forth above.

To prepare 3 - (3-methoxy-4-propoxyphenyl)-n-butyl bromide, treat 3-(3-methoxy-4-propoxyphenyl)butan-1-ol with a slight stoichiometric excess of phosphorus tribromide according to the manipulative procedure set forth above.

To prepare 3-(3-pentyloxyphenyl)-n-propyl bromide, treat 3-(3-pentyloxyphenyl)propan-1-ol with a slight stoichiometric excess of phosphorus tribromide according to the manipulative procedure set forth above.

To prepare 3-(3-cyclopentyloxyphenyl)-n-propyl chloride, treat 3-(3-cyclopentyloxyphenyl)propan-1-ol with a slight stoichiometric excess of phosphorus trichloride according to the manipulative procedure set forth above.

To prepare 3-phenyl-n-propyl bromide, treat 3-phenylpropan-1-ol with a slight stoichiometric excess of phosphorus tribromide according to the manipulative procedure set forth above.

To prepare 3 - (3,4 - methylenedioxyphenyl)-n-propyl bromide, treat 3-(3,4-methylenedioxyphenyl)propan-1-ol with a slight stoichiometric excess of phosphorus tribromide according to the manipulative procedure set forth above.

To prepare 3-(3,4-dimethoxyphenyl)-n-propyl bromide, treat 3-(3,4-dimethoxyphenyl)propan-1-ol with a slight stoichiometric excess of phosphorus tribromide according to the manipulative procedure set forth above.

To prepare 2-methyl-3-(3-methoxyphenyl)-n-propyl bromide, treat 2-methyl-3-(3-methoxyphenyl)propan-1-ol with a slight stoichiometric excess of phosphorus tribromide according to the manipulative procedure set forth above.

PREPARATION 12.—1-(m-METHOXYPHENYL)-2-BROMOPROPANE

Reflux m-methoxyphenylacetic acid (16 g.) with thionyl chloride (35 cc.) for 1 hour. Distil off the thionyl chloride at atmospheric pressure and the residue at 20 mm. pressure to give m-methoxyphenylacetyl chloride. Add dropwise simultaneously this acid chloride (15 g.) in ether (20 cc.) and a solution of sodium ethoxide (from 5 g. of the metal) in ethanol (80 cc.) to a stirred solution of diethylmalonate (18.5 g.), cooled in an ice bath at such a rate that the temperature does not rise above 5°. Pour the solution slowly into dilute sulfuric acid, extract with ether, wash, dry, evaporate the solvent and reflux with a solution of sulfuric acid (48 cc.) in water (150 cc.) for 4 hours. Extract the cooled solution with ether and remove the solvent from the washed and dried solution to obtain m-methoxyphenyl acetone as an oil. Add this ketone (10 g.) in ether (50 cc.) dropwise to a stirred suspension of lithium aluminum hydride (2 g.) in ether (60 cc.) and reflux the mixture for 1 hour, then cool and decompose by carefully adding water. Dissolve the precipitate with 10% sulfuric acid and collect the product in ether. Wash, dry and evaporate the ether solution and distil the residue at 20 mm. to obtain 1-(m-methoxyphenyl)propan-2-ol. Cool this alcohol (8 g.) in benzene (5 cc.) to 0° and add phosphorus tribromide (6 g.) in benzene (5 cc.) dropwise with stirring, keeping the temperature below 5°. After the addition is complete, heat the mixture at 60° for 3 hours and pour the cooled solution onto ice and extract the product with ether. Wash the ethereal solution sequentially with dilute aqueous sodium hydroxide, water, dilute hydrochloric acid, and brine, and then dry. Remove the solvent and distil the residue at 20 mm. to give 1-(m-methoxyphenyl)-2-bromopropane.

PREPARATION 13.—3-(3,5-DIMETHOXYPHENYL)-n-PROPYL BROMIDE

Add phosphorus tribromide (10.7 g.) in benzene (20 cc.) dropwise to 3-(3,5-dimethoxyphenyl)propan-1-ol (16 g.) in benzene (25 cc.) at 0° Keep the mixture at 0° for 1 hour and then heat at 60° for 3 hours. Decompose the cooled solution by adding ice-cold water. Separate the benzene layer and wash it with dilute aqueous sodium hydroxide, water, dilute hydrochloric acid and then dry. Remove the solvent and distil the residue at 20 mm. Hg to give 3-(3,5-dimethoxyphenyl)-n-propyl bromide.

PREPARATION 14.—5-m-METHOXYPHENYLPENT-1-YNE

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distil to obtain 5-m-methoxyphenylpent-1-yne (7.1 gm., 66%), B.P. 75–78° C./0.06 mm. Hg.

$C_{12}H_{14}O$ Calculated: C, 82.7%; H, 8.1%. Found: C, 82.2%; H, 7.8%.

To prepare 5-m-ethoxyphenylhept-1-yne treat 3-(3-ethoxyphenyl)-n-pentyl chloride with a stoichiometric excess of sodium acetylide according to the manipulative procedure set forth above.

To prepare 5-m-propoxyphenylpent-1-yne treat 3-(3-propoxyphenyl)-n-propyl chloride with a stoichiometric excess of sodium acetylide according to the manipulative procedure set fotrh above.

To prepare 5-m-pentyloxyphenylpent-1-yne treat 3-(3-pentyloxyphenyl)-n-propyl bromide with a stoichiometric excess of sodium acetylide according to the manipulative procedure set forth above.

To prepare 5-cyclopentyloxyphenylpent-1-yne treat 3-(3-cyclophentyloxyphenyl)-n-propyl chloride with a stoichiometric excess of sodium acetylide according to the manipulative procedure set forth above.

To prepare 5-m-propoxyphenylhex-1-yne treat 3-(3-propoxyphenyl)-n-butyl bromide with a stoichiometric excess of sodium acetylide according to the manipulative procedure set forth above.

To prepare 5-(3,5-diethoxyphenyl)pent-1-yne treat 3-(3,5-diethoxyphenyl)-n-propyl bromide with a stoichiometric excess of sodium acetylide according to the manipulative procedure set forth above.

To prepare 5-(3-methoxy-4-propoxyphenyl)pent-1-yne treat 3-(3-methoxy-4-propoxyphenyl) - n - propyl chloride with a stoichiometric excess of sodium acetylide according to the manipulative procedure set forth above.

To prepare 5-(3-methoxy-4-propoxyphenyl)hex-1-yne treat 3-(3-methoxy-4-propoxyphenyl) - n - butyl bromide with a stoichiometric excess of sodium acetylide according to the manipulative procedure set forth above.

PREPARATION 15.—5-PHENYLPENT-1-YNE

Add a mixture of dimethylformamide (880 cc.) and xylene (1120 cc.) to sodium acetylide (from the metal, 43.75 g.) in liquid ammonia (1250 cc.) and allow the ammonia to evaporate. Add 3-phenylpropyl bromide with stirring and continue the stirring for 5 hours while maintaining the reaction mixture at 25–30°. Then add ice-water (600 cc.) and extract the mixture thoroughly with ether. Dry the washed ether solution, evaporate the ether and distil the residue to give 5-phenylpent-1-yne as an oil (121 g.), B.P. 94°/50 mm.

$C_{11}H_{12}$ Calculated: C, 91.6%; H, 8.4%. Found: C, 91.7%; H, 8.1%.

PREPARATION 16.—5-m-NITROPHENYLPENT-1-YNE

Add 3-(3-nitrophenyl)-n-propyl bromide (5 g.) to a solution of sodium acetylide (from sodium, 0.48 g.) in liquid ammonia (100 cc.). Stir the dark solution for 12 hours, add excess ammonium chloride, evaporate the ammonia and work up the residue with ether. Distil a portion (2 g.) of the residue to obtain 5-m-nitrophenylpent-1-yne (1.8 g.), B.P. 130° C./0.1 mm.

PREPARATION 17.—5-m-HYDROXYPHENYLPENT-1-YNE

Pass dry acetylene into stirred liquid ammonia (800 cc.) and add portions of sodium (totaling 10.2 g.) piece by piece as the blue color discharges. When the addition of the sodium is complete, continue to pass acetylene into the mixture for 15 minutes. Add dimethylformamide (350 cc.) and allow the ammonia to evaporate. To the suspension of sodium acetylide thus obtained, add dropwise 3-(3-hydroxyphenyl)-n-propyl bromide (33.5 g.), and heat the mixture to 60° and maintain at that temperature for 4 hours. Allow to cool, add ice and dilute sulfuric acid until the aqueous mixture is at pH 6. Extract the mixture with ether (a total of 1000 cc.) and wash the extract with saturated brine, concentrate the washed extract to 300 cc., dry over anhydrous magnesium sulfate, and evaporate off the remaining ether. Azeotrope the product with benzene to ensure no trace of water remains, to obtain as residue a dry oil, crude 5-m-hydroxyphenylpent-1-yne (about 20 g.).

PREPARATION 18.—5-m-ACETOXYPHENYLPENT-1-YNE

Mix 5-m-hydroxyphenylpent-1-yne (about 20 g.) with pyridine (70 cc.) and acetic anhydride (30 cc.) and allow the homogeneous mixture to stand for 12 hours at room temperature. Remove excess acetic anhydride by successive additions of 95% aqueous ethanol (20 cc.) and evaporation of the ethyl acetic acetate formed. Remove the remaining solvent and water present by adding benzene and evaporating on a water bath, to obtain a brown oil which on distillation gives 5-m-acetoxyphenylpent-1-yne as a pale yellow mobile liquid (24.2 g.), B.P. 104–8°/0.1 mm.

PREPARATION 19.—5-(3,4-METHYLENEDIOXYPHENYL)PENT-1-YNE

Add sodium (4.6 g.) in small pieces to a stirred solution of liquid ammonia (250 cc.) through which a rapid stream of purified acetylene is passed. When the blue color is discharged, continue the acetylene stream for 15 minutes, and then add dry dimethylformamide (120 cc.). Allow most of the ammonia to evaporate, and then add 3-(3,4-methylenedioxyphenyl)propyl bromide (Preparation 11) (25 g.) slowly. Stir for 3 hours at 60–70°, cool the mixture in ice and decompose by the addition of water (75 cc.). Collect the product in ether and wash with 2 N-sulfuric acid, 2 N-sodium carbonate solution, water and dry. Remove the solvent by evaporation and distil the residue at 0.1 mm. Hg to obtain 5-(3,4-methylenedioxyphenyl)pent-1-yne.

Infrared (liquid film) absorption peaks at 3.06 and 6.25μ.

To prepare 5-(3,4-dimethoxyphenyl)pent-1-yne treat 3-(3,4-dimethoxyphenyl)propyl bromide (25 g.) with sodium acetylide acording to the manipulative procedure described above.

To prepare 5-(3,5-dimethoxyphenyl)pent-1-yne treat 3-(3,5-dimethoxyphenyl)propyl bromide (25 g.) with sodium acetylide according to the manipulative procedure described above.

PREPARATION 20.—5-(3-METHOXYPHENYL)HEX-1-YNE

Add sodium (11.5 g.) slowly in small pieces to a stirred solution of liquid ammonia (750 cc.) through which a rapid stream of acetylene is passing at such a rate that no blue color is formed. Add 3-(3-methoxyphenyl)-n-butyl bromide (84 g.) in tetrahydrofuran rapidly to the well-stirred mixture, and after 22 hours decompose the mixture with water, collect the product with ether, wash and dry the ethereal solution and remove solvent by evaporation. Distil the residue to obtain 5-(3-methoxyphenyl)-hex-1-yne, 56.6 g., B.P. 84–95°/0.55–0.35 mm. Hg.

$C_{13}H_{16}O$ Calculated: C, 83.00%; H, 8.57%. Found: C, 82.79%; H, 8.32%.

Infrared absorption peaks at 3.06, 4.75, 6.25μ.

PREPARATION 21.—5-(m-METHOXYPHENYL)-4-METHYL-PENT-1-YNE

Add 1-(m-methoxyphenyl)-2-bromo-propane (10 g.) to a stirred suspension of magnesium (1.7 g.) in anhydrous ether (40 cc.) containing a crystal of iodine and treat the resulting Grignard solution at 0° with 2,3-dibromoprop-1-ene (9 g.) for a period of 1 hour. Reflux the mixture for one hour, cool and decompose with saturated ammonium chloride solution. Wash with water and dry the ethereal phase and evaporate the solvent. Dissolve the residue (9 g.) in ether (25 cc.) and add the solution dropwise to a stirred suspension of sodamide (3.5 g.) in liquid ammonia (100 cc.) with external cooling (acetone-Dry Ice bath). Stir the mixture for 2 hours, and then allow it to warm up to room temperature. Add ether, and then add saturated aqueous ammonium chloride. Wash the ethereal solution, dry, evaporate the solution and distil the residue at 0.2 mm., the fraction boiling between 90° and 100° being collected, to obtain 5-(m-methoxyphenly)-4-methylpent-1-yne.

Infrared absorption peaks at 3.03 and 4.55μ.

PREPARATION 22.—1-CHLORO-6-m-METHOXYPHENYLHEXAN-3-ONE

Saturate 6-m-methoxyphenylhex-1-en-3-one (1 g.) with dry hydrogen chloride gas at 0° C. and keep the mixture at 0° C. for 48 hours. Remove the excess hydrogen chloride at 0° C. by subjecting the product to a reduced pressure of 15 mm. for 30 minutes and then at a pressure of 0.1 mm. for 15 minutes. The product obtained shows infrared absorption peaks at 5.87μ, representing a saturated ketone group, and does not give a precipitate with aqueous-ethanolic silver nitrate solution; however, on boiling with aqueous sodium hydroxide followed by acidification with nitric acid and addition of silver nitrate, a copious precipitate of silver chloride is obtained. This behaviour indicates the product is the expected 1-chloro-6-m-methoxyphenylhexan-3-one.

PREPARATION 23.—1-BROMO-6-m-METHOXYPHENYLHEXAN-3-ONE

Prepare 1-bromo-6-m-methoxyphenylhexane-3-one by saturation of 6-methoxyphenylhex-1-en-3-one (1 g.) with dry hydrogen bromide, keeping at 0° for 12 hours, and afterwards subjecting the product to a reduced pressure of 0.03 mm. for 10 minutes.

The following examples illustrate the manner of using the claimed processes of the invention for the preparation of the claimed compositions of the invention, and for the preparation of natural steroids.

Example 1.—1-diethylamino-6-m-methoxyphenylhex-2-yne

Allow 5-m-methoxyphenylpent-1-yne (8 g.) to stand for 12 hours at 70° C. under nitrogen with water (2.5 cc.), trioxan (0.5 g.), 30% formalin (5.5 g.), diethylamine (4.0 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, make alkaline with 10% aqueous sodium hydroxide, extract with ether, and then wash and dry the ether extract. Distil to obtain 1-diethylamino-6-m-methoxyphenylhex-2-yne (10.6 g., 88%), B.P. 130–131° C./0.1 mm.

$C_{17}H_{25}N$ Calculated: C, 78.7%; H, 9.7%. Found: C, 78.9%; H, 9.6%.

To prepare 1-diethylamino-6-m-ethoxyphenyloct-2-yne treat 5-m-ethoxyphenylhept-1-yne (ca. 8 g.) according to the manipulative procedure described above.

To prepare 1-diethylamino-6-m-propoxyphenylhex-2- yne treat 5-m-propoxyphenylpent-1-yne (ca. 8 g.) according to the manipulative procedure described above.

To prepare 1-diethylamino-6-m-pentoxyphenylhex-2-yne treat 5-m-pentoxyphenylpent-1-yne (ca. 8 g.) according to the manipulative procedure described above.

To prepare 1-diethylamino-6-m-cyclopentyloxyphenylhex-2-yne treat 5-m-cyclopentyloxyphenylpent-1-yne (ca. 8 g.) according to the manipulative procedure described above.

To prepare 1-diethylamino-6-m-propoxyphenylhept-2-yne treat 5-m-propoxyphenylhex-1-yne (ca. 8 g.) according to the manipulative procedure described above.

To prepare 1-diethylamino-6-(3,5-diethoxyphenyl)-hex 2-yne treat 5-(3,5-diethoxyphenyl)pent-1-yne (ca. 8 g.) according to the manipulative procedure described above.

To prepare 1 - diethylamino - 6 - (3 - ethoxy - 4-propoxyphenyl)-hex-2-yne treat 5-(3-ethoxy-4-propoxy)pent-1-yne (ca. 8 g.) according to the manipulative procedure described above.

To prepare 1 - diethylamino - 6 - (3 - ethoxy - 4-propoxyphenyl)-hept-2-yne treat 5-(3-ethoxy-4-propoxy)hex-1-yne (ca. 8 g.) according to the manipulative procedure described above.

*Example 2.—1-diethylamino-6-phenylhex-2-yne*

Maintain 5-phenylpent-1-yne (20 g.) for 12 hours at 70° under nitrogen with water (6.2 cc.), trioxan (1.2 g.), 30% formalin (13.8 g.), diethylamine (10 g.), acetic acid (6.9 g.), dioxan (62 cc.) and cuprous chloride (0.35 g.). Make the cooled solution alkaline with sodium hydroxide. Extract with ether and extract the ether extract itself with hydrochloric acid. Make the purified aqueous hydrochloric solution thus obtained alkaline again and extract with ether. Dry, evaporate the ether extract and distil the residue to obtain 1-diethlamino-6-phenyl-hex-2-yne (27.1 g.), B.P. 104–106°/0.2 mm.

$C_{16}H_{23}N$ Calculated: C. 83.8%; H, 10.1%. Found: C. 83.9%; H, 10.1%.

Prepare 1-diethylamino-6-m-nitrophenylhex-2-yne (1.5 g.), B.P. 148° C./0.05 mm., by treating 5-m-nitrophenylpent-1-yne (1.8 g.) with water (0.6 cc.) trioxan (0.1 g.), 30% formalin (1.4 g), diethylamine (1.0 g.), acetic acid (0.7 g.), dioxan (6.2 cc.) and cuprous chloride (0.03 g.) according to the manipulative procedure described above.

*Example 3.—1-diethylamino-6-m-acetoxyphenylhex-2-yne*

Add 5-m-acetoxyphenylpent-1-yne (9.5 g.) to a mixture of trioxan (0.5 g.), 40% formalin (5.5 g.), diethylamine (4 g.), acetic acid (2.75 g.), dioxan (25 cc.) and cuprous chloride (0.13 g.), at room temperature. Heat the mixture thus obtained to 70°, to obtain a clear green solution, and maintain under nitrogen at that temperature for 12 hours. Cool and add ice, pour the product into ice-cold saturated potassium bicarbonate and extract the mixture with ether. Wash and dry, evaporate the extracts under reduced pressure and distil to obtain 1-diethylamino-6-m-acetoxyphenylhex-2-yne (9.9 g.), B.P. 152–154°/0.1. mm., as a pale yellow mobile liquid.

*Example 4.—1-diethylamino-6-(3,4-methylenedioxyphenyl)-hex-2-yne*

Add 5-(3,4-methylenedioxyphenyl)pent-1-yne (24.5 g.) in dioxan (15 cc.) to a mixture of diethylamine (16 g.), trioxan (7.2 g.) and cuprous chloride (0.3 g.) in dioxan (20 cc.) and heat the mixture at 100° for 15 hours under an atmosphere of nitrogen. Filter the cooled solution, remove the solvent and distil the residue at 0.1 mm. Hg to obtain 1-diethylamino-6-(3,4-methylenedioxyphenyl)-hex-2-yne after a forerun of more volatile material, Infrared absorption peaks at 6.25, 12.20μ.

*Example 5.—1-diethylamino-6-(3,4-dimethoxyphenyl)-hex-2-yne*

Heat a mixture of 5-(3-,4-dimethoxyphenyl)-pent-1-yne (8 g.), water (2.5 cc.), trioxan (0.5 g.), 30% formalin (5.5 g.), diethylamine (4.0 g.), acetic acid (2.75 g.), dioxan (25 cc.) and cuprous chloride (0.13 g.) at 70° for 15 hours. Make the cooled solution alkaline with 10% aqueous sodium hydroxide and collect the product. Wash the ethereal solution with water and extract with 10% hydrochloric acid (3×30 cc.). Wash the combined aqueous extracts with ether, make it alkaline with 10% sodium hydroxide solution and extract with ether. Wash and dry the etheral solution, evaporate the solvent and distil the residue at 0.1 mm. Hg to obtain 1-diethylamino-6-(3,4-dimethoxyphenyl)-hex-2-yne.

Infrared absorption peaks at 6.25, 12.20μ.

Prepare 1-diethylamino-6-(3,5-dimethoxyphenyl)-hex-2-yne by treating 5-(3,5-dimethoxyphenyl)-pent-1-yne with water, trioxan, 30% formalin, diethylamine, acetic acid, dioxan and cuprous chloride according to the manipulative procedure described above.

*Example 6.—1-diethylamino-6-(3-methoxyphenyl)-hept-2-yne*

Heat a mixture of 5 - (3-methoxyphenyl) - hex-1-yne (56.6 g.), water (17.5 cc.), 40% formalin (38.5 cc.), diethylamine (40 cc.), acetic acid (19 cc.), dioxan (1.75 cc.) and cuprous chloride (1 g.) at 70° for 16 hours in an atmosphere of nitrogen. Make the cooled solution alkaline with 10% aqueous sodium hydroxide and extract twice with ether. Wash the ether extracts with water, filter and extract with 4 N hydrochloric acid (3×350 cc.). Make the acid extracts alkaline with 10% aqueous sodium hydroxide, extract with ether and wash the organic solution with water, brine and dry. Evaporate the solvent and distil the residue to obtain 1-diethylamino-6-(3-methoxyphenyl)-hept-2-yne, 79.5 g., B.P. 135–140°/0.2 mm. Hg $n_D^{25}$ 1.5116.

$C_{18}H_{27}ON$ Calculated: C, 79.07%; H, 9.95%. Found: C, 78.99%; H, 9.67%.

*Example 7.—1-diethylamino-5-methyl-6-(m-methoxyphenyl)-hex-2-yne*

Heat 5-(m-methoxyphenyl)-4-methyl-pent-1-yne (8 g.), trioxan (0.5 g.), 30% formalin (5.5 cc.), diethylamine (4 g.), acetic acid (2.75 g.), dioxan (25 cc.), and cuprous chloride (0.12 g.) together at 70° for 15 hours. Make cooled solution alkaline with 10% aqueous sodium hydroxide and extract with ether. Wash the ethereal solution with water and extract with 10% hydrochloric acid (3×20 cc.). Combine the acid extracts wash with ether and make alkaline with 10% aqueous sodium hydroxide and extract with ether. Wash the ethereal solution, dry, remove the solvent and distil the residue at 0.1 mm. to obtain 1-diethylamino-5-methyl-6-(m-methoxyphenyl)-hex-2-yne.

*Example 8.—1-diethylamino-6-m-methoxyphenylhexan-3-one and 6-m-methoxyphenylhex-1-en-3-one*

Add mercuric sulfate (0.45 g.) to a swirled solution of 1-diethylamino-6-m-methoxyphenylhex-2-yne (8.5 g.) in concentrated sulfuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1 - diethylamino - 6-m-methoxyphenylhexan-3-one, infrared absorption peak at 1710μ. Distill under reduced pressure with partial elimination of diethylamine, to obtain a mixture of the ketoamine 1-diethylamino-6-m-methoxyphenylhexan-3-one and the vinyl ketone 6-m-methoxyphenylhex-1-en-3-one (7.1 g., ca. 76%), B.P. 140–145° C./0.1 mm.; infrared absorption peaks at 5.85 and 5.95μ, the ketoamine predominating.

Distil a second portion of the crude ketoamine 1-diethylamino-6-m-methoxyphenylhexan-3-one very slowly over a period of 30 minutes through a Vigreux fractionating column 10 cm. high and 1 inch diameter under reduced pressure to eliminate most of the diethylamine. Dissolve the 6-m-methoxyphenylhex-1-en-3-one obtained (B.P. 104–111° C./0.7 mm.) in ether and wash the ether solution with dilute hydrochloric acid, followed by aqueous sodium bicarbonate and water. Dry and evaporate. Distil the residue to give the pure vinyl ketone as a colorless liquid, B.P. 76° C./0.3 mm.

$C_{13}H_{16}O_2$ Calculated: C, 76.4%; H, 7.9%. Found: C, 76.3%; H, 8.0%.

Mix a third portion of the crude undistilled 1-diethylamino-6-m-methoxyphenylhexan-3-one (3 g.) with methyl iodide (3 g.). An exothermic reaction soon develops. After 12 hours wash the mixture with ether to remove unchanged reactants and subject to reduced pressure (15 minutes) to remove ether remaining; the residue is the crude methiodide of the ketoamine (4.6 g.).

Infrared absorption peaks at $5.85\mu$.

This compound is useful for preparing the novel compositions of this invention which have hormonal activity.

*Example 9.—1-diethylamino-6-phenylhexan-3-one and 6-phenylhex-1-en-3-one*

Add to a solution of 1-diethylamino-6-phenylhex-2-yne (27.1 g.) in concentrated sulfuric acid (7.6 cc.) diluted with water (77 cc.) at 70° mercuric sulfate (1.6 g.), and keep the solution under nitrogen for 1 hour; cool, make basic with sodium hydroxide solution, and filter through glass wool to remove mercuric oxide. Extract the product with ether and evaporate the washed and dried ethereal solution, leaving crude 1-diethylamino-6-phenylhexan-3-one. Distil under reduced pressure with this ketoamine undergoing partial elimination of diethylamine, to obtain a mixture of the ketoamine, and 6-phenylhex-1-en-3-one (18.9 g.), B.P. 96°/0.003 mm.

Infrared absorption peaks at 5.88 and $5.95\mu$.

To prepare 1-diethylamino-6-m-ethoxyphenyloctan-3-one and 6-m-ethoxyphenyloct-1-en-3-one, hydrate and distil 1-diethylamino-6-m-ethoxyphenyloct-2-yne in the presence of mercury salts according to the manipulative procedure set forth above.

To prepare 1-diethylamino-6-m-propoxyphenylhexan-3-one and 6-m-propoxyphenylhex-1-en-3-one, hydrate and distil 1-diethylamino-6-m-propoxyphenylhex-2-yne in the presence of mercury salts according to the manipulative procedure set forth above.

To prepare 1-diethylamino-6-m-pentoxyphenylhexan-3-one and 6-m-pentoxyphenylhex-1-en-3-one, hydrate and distil 1-diethylamino-6-m-pentoxyphenylhex-2-yne in the presence of mercury salts according to the manipulative procedure set forth above.

To prepare 1-diethylamino-6-m-cyclopentyloxyphenylhexan-3-one and 6-m-cyclopentyloxyphenylhex-1-en-3-one, hydrate and distil 1-diethylamino-6-m-cyclopentyloxyphenylhex-2-yne in the presence of mercury salts according to the manipulative procedure set forth above.

To prepare 1-diethylamino-6-m-propoxyphenylheptan-3-one and 6-m-propoxyhept-1-en-3-one, hydrate and distil 1-diethylamino-6-m-propoxyphenylhept-2-yne in the presence of mercury salts according to the manipulative procedure set forth above.

To prepare 1-diethylamino-6-(3,5-diethoxyphenyl)hexan-3-one and 6-(3,5-diethoxyphenyl)-hex-1-en-3-one, hydrate and distil 1-diethylamino-6-(3,5-diethoxyphenyl)hex-2-yne in the presence of mercury salts according to the manipulative procedure set forth above.

To prepare 1-diethylamino-6-(3-ethoxy-4-propoxyphenyl)hexan-3-one and 6-(3-ethoxy-4-propoxyphenyl)hex-1-en-3-one, hydrate and distil 1-diethylamino-6-(3-ethoxy-4-propoxyphenyl)hex-2-yne in the presence of mercury salts according to the manipulative procedure set forth above.

These compounds are useful for preparing the novel compositions of this invention which have hormonal activity.

*Example 10.—1-diethylamino-6-m-nitrophenylhexan-3-one and 6-m-nitrophenylhex-1-en-3-one*

Hydrate 1-diethylamino-6-m-nitrophenylhex-2-yne (1.5 g.) using the procedure of Example 9 with one twentieth of the quantities of reagents. Remove the solvent to obtain crude 1-diethylamino-6-m-nitrophenylhexan-3-one as a clear pale yellow liquid. Distil under reduced pressure, with considerable elimination of diethylamine, to obtain crude 6-m-nitrophenylhex-1-en-3-one (1 g.) as a clear pale yellow liquid.

*Example 11.—1-diethylamino-6-m-hydroxyphenylhexan-3-one*

Add mercuric sulfate (0.27 g.) rapidly with swirling to a solution of 1-diethylamino-6-m-acetoxyphenylhex-2-yne (3.1 g.) in 10% aqueous sulfuric acid (15 cc.), and heat the resulting green solution at 75° under nitrogen for 1½ hours. After cooling, filter to remove mercuric sulfate and add solid potassium bicarbonate until the product has pH 8.8. Extract the solution with ether. Wash the other extracts with brine made alkaline to pH 8.8, and dry over anhydrous magnesium sulfate. Evaporate the ether at room temperature to obtain as residue crude 1-diethylamino-6-m-hydroxyphenylhexan-3-one as a viscous brown oil (2.4 g.) showing infrared absorption at $5.85\mu$ indicating the presence of a keto group, together with the characteristic band of a phenolic hydroxy group and the complete absence of a band at $5.68\mu$ corresponding to a phenolic acetate group.

This compound is useful for preparing the novel compositions of this invention which have hormonal activity.

*Example 12.—1-diethylamino-6-m-acetoxyphenylhexan-3-one and 6-m-acetoxyphenylhex-1-en-3-one*

Acetylate the crude 1-diethylamino-6-m-hydroxyphenylhexan-3-one (2.4 g.) by adding pyridine (7 cc.) and acetic anhydride (3 cc.) and allow the mixture to stand overnight at room temperature. Work up the mixture as in the acetylation stage described in the preparation of 5-m-acetoxyphenylpent-1-yne above, to obtain crude 1-diethylamino-6-m-acetoxyphenylhexan-3-one as a viscous brown oil (2.7 g.).

Infrared absorption peaks at $5.68\mu$ with a shoulder at $5.85\mu$ and no appreciable phenolic absorption.

Distil in a Hickman still at 0.1 mm., with partial elimination of diethylamine, and collect a colorless mobile liquid, B.P. 160–70°/0.1 mm., which is a mixture (1.8 g.) of the ketoamine and 6-m-acetoxyphenylhex-1-en-3-one.

Infrared absorption peaks at 5.68, 5.88, $5.95\mu$, the nature of the absorption indicating a predominance of the vinyl ketone in the mixture.

These compounds are useful for preparing the novel compositions of this invention which have hormonal activity.

*Example 13.—1-diethylamino-6-(3,4-dihydroxyphenyl)hexan-3-one*

Add mercuric sulfate (0.27 g.) to a swirled solution of 1-diethylamino-6-(3,4-methylenedioxyphenylhex-2-yne) (3 g.) in 10% aqueous sulfuric acid (15 cc.) and heat the mixture for 90 minutes at 75° in an atmosphere of nitrogen. Filter the cooled reaction mixture and add solid potassium carbonate to pH 8.5. Extract the product with ether, wash and dry and evaporate the solvent to leave as residue crude 1-diethylamino-6-(3,4-dihydroxyphenyl)hexan-3-one.

Infrared absorption peaks at $5.85\mu$.

This compound is useful for preparing the novel compositions of this invention which have hormonal activity.

*Example 14.—1-diethylamino-6-(3,4-dimethoxyphenyl)-hexan-3-one and 6-(3,4-dimethoxyphenyl)hex-1-en-3-one*

Add mercuric sulfate (0.45 g. to a stirred solution of 1-diethylamino-6-(3,4-dimethoxyphenyl)hex-2-yne (8.5 g.)

in concentrated sulfuric acid (2.5 cc.) and water (25 cc.) and maintain the solution at 75° for 90 minutes. Make the cooled solution basic with 10% aqueous sodium hydoxide and filter to remove mercuric oxide. Extract the product with ether and wash and dry the ethereal solution. Evaporate the solvent to obtain 1-diethylamino-6-(3,4-dimethoxyphenyl)hexan-3-one as an oily residue.

Infrared absorption peaks (liquid film) 5.85μ.

Slowly distil through a short fractionating column at 0.1 mm. Hg to obtain mainly the eliminated product 6-(3,4-dimethoxyphenyl)hex-1-en-3-one.

Infrared absorption peaks (liquid film) 5.95μ.

This compound is useful for preparing the novel compositions of this invention which have hormonal activity.

*Example 15.—1-diethylamino-6-(3,5-dimethoxyphenyl)-hexan-3-one and 6-(3,5-dimethoxyphenyl)hex-1-en-3-one*

Proceed exactly as described for the preparation of the 3,4-dimethoxy compound above, using 6-(3,5-dimethoxyphenyl)-1-diethylaminohex-2-yne (8.5 g.), mercuric sulfate (0.45 g.), and 10% sulfuric acid (25 cc.) to obtain 1-diethylamino-6-(3,5-dimethoxyphenyl)hexan-3-one and 6-(3,5-dimethoxyphenyl)hex-1-en-3-one.

*Example 16.—1-diethylamino-6-(m-methoxyphenyl)-heptan-3-one and 6-(m-methoxyphenyl)hept-1-en-3-one*

Dissolve 1-diethylamino-6-(m-methoxyphenyl)hept-2-yne (13.6 g.) in 10% aqueous sulfuric acid (40 cc.) and stir with mercuric sulfate (0.69 g.) for 2 hours at 70°. Filter the cooled solution, make basic with 10% aqueous sodium hydroxide and extract with ether. Wash the ethereal solution with water and brine, and dry (Na$_2$SO$_4$). Evaporate the solvent and distil the residue to obtain 1-diethylamino-6-(m-methoxyphenyl)heptan-3-one which has partially eliminated to 6-(m-methoxyphenyl)hept-1-en-3-one during the distillation, B.P. 145°/12 mm. Hg.

Infrared absorption peaks at 5.95μ.

This compound is useful for preparing the novel compositions of this invention which have hormonal activity.

*Example 17.—1-diethylamino - 6 - (m - methoxyphenyl) - 5 - methylhexan - 3 - one and 5 - methyl - 6 - (m - methoxyphenyl)hex-1-en-3-one*

Add mercuric sulfate (0.45 g.) to a stirred solution of 1 - diethylamino - 5 - methyl - 6 - (m - methoxyphenyl) hex-2-yne (8 g.) in concentrated sulfuric acid (2.5 cc.) and water (25 cc.) and heat the mixture at 70° for 1½ hours. Filter the cooled solution, make basic with 10% aqueous sodium hydroxide and extract with ether. Wash and dry the ethereal solution and evaporate to leave as residue crude 1-diethylamino-6-(m-methoxyphenyl)-5-methylhexan-3-one; infrared absorption peaks at 5.85μ. Slowly distil at 0.1 mm. Hg to obtain 5-methyl-6-(m-methoxyphenyl)hex-1-en-3-one; infrared absorption peaks at 5.85μ.

This compound is useful for preparing the novel compositions of this invention which have hormonal activity.

*Example 18.—6-(m-methoxyphenyl)hex-1-en-3-one*

Add mercuric sulfate (1.12 g.) to a swirled solution of 1-diethylamino-6-(m-methoxyphenyl)hex-2-yne (2.5 g.) in concentrated sulfuric acid (6.25 g.) and water (62 cc.). Maintain the solution at 75° C. for 2 hours, then cool, filter, make basic and extract with ether. After the solvent has been removed, distil the residue slowly over a period of 30 minutes through a Vigreux fractionating column of height 10 cm. and diameter 1 cm. under reduced pressure, to obtain the crude vinyl ketone (14.5 g., B.P. 115–123° C./0.05 mm.) containing a very small amount of ketoamine.

To obtain the pure vinyl ketone, dissolve the distillate (5.2 g.) in ether, wash the solution with dilute hydrochloric acid, followed by water and sodium bicarbonate solution, dry, and evaporate the ether and redistil the residue. The pure vinyl ketone, 6-(m-methoxyphenyl) hex-1-en-3-one (B.P. 116.8° C./0.5 mm.), shows infrared absorption peak at 5.97μ.

C$_{13}$H$_{16}$O$_2$ Calculated: C, 76.4%; H, 7.9%. Found: C, 76.3%, H, 8.0%.

This compound is useful for preparing the novel compositions of this invention which have hormonal activity.

*Example 19.—1-diethylamino-6-m-methoxyphenylhexan-3-one methiodide*

Mix crude undistilled 1-diethylamino-6-m-methoxyphenylhexan-3-one (3 g.) with methyl iodide (3 g.). An exothermic reaction soon develops and after 12 hours wash the mixture with ether to remove unchanged reactants and evaporate under reduced pressure (15 mm.) to remove ether remaining; the residue is the crude methiodide of the ketoamine (4.8 g.); infrared absorption peak at 1710 mμ.

This compound is useful for preparing the novel compositions of this invention which have hormonal activity.

*Example 20.—2-ethylcyclopentane-1,3-dione*

Dissolve 2-ethylcyclopentane-1,3,4-trione hydrate (30 g., M.P. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water (200 cc.) with vigorous stirring throughout. Filter off the semicarbazone precipitated wash with methonal, and purify by stirring in refluxing methanol; filter to obtain a pale cream powder, M.P. 179–182°.

Dissolve the semicarbazone (34 g.) in a solution of potassium hydroxide (34 g.) in dry ethylene glycol at 130°, and heat the mixture to 160° for 1 hour, followed by 30 minutes at 180°. Distil the glycol at 0.01 mm., dissolve the residual solid in water (150 cc.) and make the solution acid to Congo Red with hydrochloric acid. Cool to 0° overnight and filter. Recrystallize the residue from water to obtain 2-ethylcyclopentane-1,3-dione (10 g.), M.P. 180° with sublimation.

This compound is useful for preparing the novel compositions of this invention which have hormonal activity.

*Example 21.—2-n-propylcyclopentane-1,3-dione*

Condense methyl n-butyl ketone with diethyl oxalate in the presence of sodium ethoxide, and convert the glyoxylate obtained by heating with hydrochloric acid to 2-n-propylcyclopentane-1,3,5-trione, from which prepare the semicarbazone, M.P. 285–289° (decomp.) using semicarbazide hydrochloride and sodium acetate. Heat the semicarbazone with potassium hydroxide in ethylene glycol to obtain 2-n-propylcyclopentane-1,3-dione, M.P. 175°.

This compound is useful for preparing the novel compositions of this invention which have hormonal activity.

*Example 22.—2-isopropylcyclopentane-1,3-dione*

Add methyl isobutyl ketone (50 g.) and diethyl oxalate (160 g.) to an ice-cold solution of sodium (23 g.) in dry ethanol (350 cc.) with efficient stirring, and then reflux the mixture for 30 minutes, cool in ice and quickly add aqueous sulfuric acid (50%, 55 cc.). After 15 minutes filter off sodium sulfate, wash with ethanol and add the washings to the filtrate; next evaporate to dryness under reduced pressure to obtain ethyl 4-isopropyl-2,3,5-trioxocyclopentylglyoxalate as an uncrystallizable oil. Boil this oil with 2 N hydrochloric acid (1500 cc.) for 1 hour and decant the hot solution from residual tarry material. Filter off the crystals which precipitate from the cooled decanted solution and recrystallize from aqueous ethanol as 2-isopropylcyclopentane-1,3,5-trione, M.P. 109–112°.

Treat the trione thus obtained (25 g.) by a procedure analogous to that described for the corresponding 2-ethyl compound to obtain 2-isopropylcyclopentane-1,3-dione (8.9 g.), M.P. 146°.

To prepare 2-(2-hydroxyethyl)cyclopentane-1,3-dione treat 4-oxopentan-1-ol with diethyl oxalate, then subject to acid hydrolysis and treat the triene so obtained by the procedure described for the above isopropyl compound.

To prepare 2-(dimethylaminopropyl)cyclopentane-1,3-dione treat 1-dimethylamino-hexan-5-one with diethyl oxalate, then subject to acid hydrolysis and treat the triene so obtained by the procedure described for the above isopropyl compound.

To prepare 2-(2-hydroxypropyl)cyclopentane-1,3-dione treat 2-hydroxyhexan-5-one with diethyl oxalate, then subject to acid hydrolysis and treat the triene so obtained by the procedure described for the above isopropyl compound.

To prepare 2-phenethylcyclopentane-1,3-dione treat 1-phenyl-pentan-4-one with diethyl oxalate, then subject to acid hydrolysis and treat the triene so obtained by the procedure described for the above isopropyl compound.

To prepare 2-isopentylcyclopentane-1,3-dione treat 2-methyl-heptan-6-one with diethyl oxalate, then subject to acid hydrolysis and treat the triene so obtained by the procedure described for the above isopropyl compound.

These compounds are useful for preparing the novel compositions of this invention which have hormonal activity.

*Example 23.—2-n-butylcyclopentane-1,3-dione*

Condense methyl n-pentyl ketone with diethyl oxalate in the presence of sodium ethoxide, and convert the glyoxylate obtained by heating with hydrochloric acid to 2-n-butylcyclopentane-1,3,5-trione, from which prepare the semicarbazone, M.P. 285–290° (decomp.) using semicarbazide hydrochloride and sodium acetate. Heat the semicarbazone with potassium hydroxide in ethylene glycol to obtain 2-n-butylcyclopentane-1,3-dione, M.P. 149–151°.

This compound is useful for preparing the novel compositions of this invention which have hormonal activity.

*Example 24.—2-isobutyl-1,3-cyclopentanedione*

Add methyl isoamyl ketone (228.4 g.) and diethyl oxalate (644.1 g.) to an ice-cold solution of sodium methoxide (224 g.) in dry ethanol (1400 cc.) with vigorous stirring and reflux the mixture for 1½ hours, cool in ice water and then add aqueous sulfuric acid (202 cc. conc. sulfuric acid; 1460 cc. $H_2O$). After refluxing for 1½ hours, cool the reaction mixture containing 2-isobutylcyclopentane-1,3,5-trione to 25° and treat with aqueous sodium hydroxide (50%; 585 cc.). Filter off sodium sulfate precipitate and wash with methanol (800 cc.). Add the washings to the filtrate and adjust the pH of the resulting solution to 4.5 by adding glacial acetic acid (96 cc.). To this solution add dropwise and with stirring over a period of 40 minute a solution of semicarbazide hydrochloride (223 g.) and sodium acetate (196 g.) in water (860 cc.). Filter off the precipitate, wash with water (3×380 cc.), methanol (3×380 ml.) and dry, to obtain 3-isobutyl-1,2,4-cyclopentane-trione-1-semicarbazone (184 g., 40.8%); M.P. 277°.

Add the semicarbazone (184 g.) to a solution of sodium methoxide (140 g.) in decanol (817 cc.) at 120° during 30 minutes and slowly raise the temperature to 200° to remove volatiles boiling below this temperature and then maintain between 205–215° for 3 hours. After lowering the temperature to 80°, add water 820 cc.) and stir the mixture until the solids dissolve. Adjust the pH of the mixture to 8 by adding aqueous hydrochloric acid and separate the two layers. Extract the decanol layer with 2 portions (each 150 cc.) of water and wash the combined water layers with toluene. Make the aqueous solution acid to Congo Red with hydrochloric acid, cool to 10°, filter and dry the product, to obtain 2-isobutyl-1,3-cyclopentanedione (113.6 g., 90.6%); M.P. 194–196° after crystallization from ethanol.

$C_9H_{14}O$ Calculated: C, 70.02%; H, 9.15%. Found: C, 70.31%; H, 9.25%.

This compound is useful for preparing the novel compositions of this invention which have hormonal activity.

*Example 25.—2-cetylcyclopentane-1,3-dione*

Condense methyl n-heptadecyl ketone with diethy oxalate in the presence of sodium ethoxide to give ethyl 4-cetyl-2,3,5-trioxo-cyclopentyl glyoxylate, which is isolated and recrystallized from hexane, M.P. 69°. Reflux this ester with concentrated hydrochloric acid to obtain 2-cetylcyclopentane-1,3,5-trione monohydrate, M.P. 97–102°, from which prepare the semicarbazone, M.P. 261° (decomp.) using semicarbazide hydrochloride and sodium acetate. Heat the semicarbazone with potassium hydroxide in ethylene glycol to obtain 2-cetylcyclopentane-1,3-dione, M.P. 128–130°, on recrystallization from chloroform.

This compound is useful as an intermediate for preparing the novel compositions of this invention having hormonal activity.

*Example 26.—2-diethylaminoethylcyclopentane-1,3-dione*

Dissolve sodium (11.5 g.) in absolute alcohol (175 ml.), cool to 0° C., and add a solution of ethyl oxalate (80.0 g.) and 5-diethylaminopentanone-2 (38.0 g.) while stirring during ¾ hour. After the reaction mixture is stirred another hour, reflux for 30 minutes followed by cooling to 5° C. Acidify the reaction mixture with HCl gas and after separating from NaCl, evaporate to dryness (86.0 g.) Reflux the ester with 2N HCl (500 ml.) for 1 hour and evaporate the reaction mixture to approximately 100 ml. After neutralizing with $NaHCO_3$, extract the reaction mixture with $CHCl_3$ in a continuous extractor. Dry the original layer over $Na_2SO_4$ and remove the solvent. Dissolve the residue (21.1 g.) in water (500 ml.) and adjust the pH of the resulting solution to 7 by addition of 2 N hydrochloric acid. Extract the solution with chloroform. Dry the organic layer, filter and remove the chloroform by distillation. Distil the product of 0.01 mm., M.P. 95° C.

$C_{11}H_{19}NO_2$ Calculated: C, 66.97%; H, 9.71%; N, 7.10%. Found: C, 66.76%; H, 10.35%; N, 6.91%.

This compound is useful as an intermediate for preparing the novel compositions of this invention having hormonal activity.

*Example 27.—2-(6-m-methoxyphenyl-3-oxohexyl)-2-methylcyclohexane-1,3-dione*

Reflux a mixture (9 g.) of 1 - diethylamino - 6 - m-methoxyphenyl - hexan - 3 - one and 6 - m - methoxyphenylhex - 1 - en - 3 - one with 2 - methylcyclohexane-1,3-dione (4 g.) in benzene (44 cc.) containing pyridine (3.5 cc.) for 15 hours. Wash and dry the cooled solution. Remove the solvent to obtain the triketone 2 - (6 - m - methoxyphenyl - 3 - oxohexyl) - 2 - methylcyclohexane - 1,3 - dione (8.2 g.); infrared absorption peaks at 5.88, 5.85, 5.83μ.

This compound is useful as an intermediate for preparing the novel compositions of this invention having hormonal activity.

*Example 28.—2-(6-m-methoxylphenyl-3-oxohexyl)-2-methylcyclohexane-1,3-dione*

To a mixture of 1-chloro-6-(m-methoxyphenyl)hexan-3-one (0.625 g.), 2 - methylcyclohexane - 1,3 - dione (0.47 g.) and tert-butyl alcohol (0.06 cc.) slowly add triethylamine (0.4 cc.). Heat the mixture at 60° C. for 10 minutes, cool and add ether, wash the solution with dilute sulfuric acid followed by ammonium sulfate solution and dry; evaporate to obtain the Michael adduct 2 - (6 - m - methoxyphenyl - 3 - oxohexyl) - 2 - methylcyclohexane-1,3-dione as a gum.

This compound is useful as an intermediate for preparing the novel compositions of this invention having hormonal activity.

Example 29.—2-(6-m-methoxyphenyl-3-oxohexyl)-2-methylcyclohexane-1,3-dione

Add to the crude undistilled ketoamine 1-diethylamino-6-(m-methoxyphenyl)hexan-3-one (2.3 g.), the material obtained by hydration of the acetylenic amine, 2-methylcyclohexane-1,3-dione (1 g.), pyridine (1 cc.) and benzene (12 cc.) and reflux the mixture for 15 hours. Cool the mixture and filter off unreacted dione, add a little ether to the filtrate, and wash the ethereal solution with acid, and then water, and dry. Evaporate the solvents to obtain as residue crude 2-(6-m-methoxyphenyl-3-oxohexyl)-2-methylcyclohexane-1,3-dione (1.7 g.).

This compound is useful as an intermediate for preparing the novel compositions of this invention having hormonal activity.

Example 30.—2-(6-m-methoxyphenyl-3-oxohexyl)-2-methylcyclopentane-1,3-dione

Reflux a mixture (6 g.) of 1-diethylamino-6-m-methoxyphenlhexan-3-one and 6-m-methoxyphenylhex-1-en-3-one with 2-methylcyclopentane-1,3-dione (2.8 g.) in 0.12% dry methanolic postassium hydroxide solution (20 cc.) for 12 hours. Remove most of the methanol under reduced pressure and add a mixture (50 cc.) of equal volumes of benzene and ether; wash the solution with water, alkali and hydrochloric acid, and dry. Evaporate the solvent to obtain the adduct, the triketone 2-(6-m-methoxyphenyl-3-oxophexyl)-2-methylcyclopentane-1,3-dione (6.7 g.), a viscous brown gum.

To prepare 2-(6-m-methoxyphenyl-3-oxohexyl)-2-n-butylcyclopentane-1,3-dione, treat a mixture of 1-diethylamino-6-m-methoxyphenylhexan-3-one and 6 - m - methoxyphenylhex-1-en-3-one with 2-butylcyclopentane-1,3-dione and dry methanolic potassium hydroxide solution according to the manipulative procedure described above.

To prepare 2-(6-m-methoxyphenyl-3-oxohexyl)-2-hydroxypropyl-cyclopentane-1,3-dione, treat a mixture of 1-diethylamino-6-m-methoxyphenylhexan-3-one and 6-m-methoxyphenylhex-1-en-3-one with 2-hydroxypropylcyclopentane-1,3-dione and dry methanolic potassium hydroxide solution according to the manipulative procedure described above.

To prepare 2-(6-m-ethoxyphenyl-3-oxohexyl)-2-ethyl-cyclopentane-1,3-dione, treat a mixture of 1-diethylamino-6-m-ethoxyphenylhexan-3-one and 6-m-ethoxyphenylhex-1-en-3-one with 2-ethylcyclopentane-1,3-dione and dry methanolic potassium hydroxide solution according to the manipulative procedure described above.

To prepare 2 - (6 - m-propoxyphenyl-3-oxohexyl)-2-phenethylcyclopentane-1,3-dione, treat a mixture of 1-diethylamino-6-m-propoxyphenyl-hexan-3-one and 6-m-propoxyphenylhex-1-en-3-one with 2-phenethylcyclopentane-1,3-dione and dry methanolic potassium hydroxide solution according to the manipulative procedure described above.

To prepare 2-(6-m-pentyloxyphenyl-3-oxohexyl)-2-isobutylcyclopentane-1,3-dione, treat a mixture of 1-diethylamino-6-m-pentyloxyphenylhexan-3-one and 6-m-pentyloxyphenylhex-1-en-3-one with 2-isobutylcyclopentane-1,3-dione and dry methanolic potassium hydroxide solution according to the manipulative procedure described above.

To prepare 2-(6-m-cyclopentyloxyphenyl-3-oxohexyl)-2-hydroxypropylcyclopentane-1,3-dione, treat a mixture of 1-diethylamino-6-m-cyclopentyloxyphenylhexan-3-one and 6-m-cyclopentyloxyphenylhex-1-en-3-one with 2-hydroxypropylcyclopentane-1,3-dione and dry methanolic potassium hydroxide solution according to the manipulative procedure described above.

To prepare 2 - (6 - m-hydroxyphenyl - 3 - oxohexyl)-2-phenethylcyclopentane-1,3-dione, treat a mixture of 1-diethylamino-6-m-hydroxyphenylhexan-3-one and 6-m-hydroxyphenylhex-1-en-3-one with 2-phenethylcyclopentane-1,3-dione and dry methanolic potassium hydroxide solution according to the manipulative procedure described above.

To prepare 2-[6-(3,4-dimethoxyphenyl)-3-oxohexyl]-2-diethylaminoethylcyclopentane-1,3-dione, treat a mixture of 1-diethylamino - 6-(3,4-dimethoxyphenyl)hexan-3-one and 6-(3,4-dimethoxyphenyl)hex-1-en-3-one with 2-diethylaminoethylcyclopentane-1,3-dione and dry methanolic potassium hydroxide solution according to the manipulative procedure described above.

To prepare 2-[6-(3,5-dimethoxyphenyl)-3-oxoheptyl]-2-dimethylaminopropylcyclopentane - 1,3 - dione, treat a mixture of 1-diethylamino-6-(3,5-dimethoxyphenyl)heptan - 3 - one and 6-(3,5-dimethoxyphenyl)hept-1-en-3-one with 2-dimethylaminopropylcyclopentane-1,3-dione and dry methanolic potassium hydroxide solution according to the manipulative procedure described above.

To prepare 2-[6-(3,5-diethoxyphenyl)-3-oxooctyl]-2-n-butyl-cyclopentane-1,3-dione, treat a mixture of 1-diethylamino-6-(3,5-diethoxyphenyl)octan-3-one and 6-(3,5-diethoxyphenyl)oct-1-en-3-one with 2 - butylcyclopentane-1,3-dione and dry methanolic potassium hydroxide solution according to the manipulative procedure described above.

To prepare 2-[6-(3-methoxy - 4 - ethoxyphenyl)-3-oxohexyl]-2-n-propylcyclopentane-1,3-dione, treat a mixture of 1 - diethylamino-6-(3-methoxy-4-ethoxyphenyl)hexan-3-one and 6-(3-methoxy-4-ethoxyphenyl)-hex-1-en-3-one with 2-propylcyclopentane-1,3-dione and dry methanolic potassium hydroxide solution according to the manipulative procedure described above.

To prepare 2-(6-m-methoxyphenyl - 3 - oxohexyl)-2-n-propylcyclopentane-1,3-dione, treat a mixture of 1-diethylamino-6-m-methoxyphenyl - hexan - 3 - one and 6-m-methoxyphenylhex-1-en-3-one with 2 - propylcyclopentane-1,3-dione and dry methanolic potassium hydroxide solution according to the manipulative procedure described above.

To prepare 2-(6-m-acetoxyphenyl-3-oxohexyl)-2-ethyl-cyclopentane-1,3-dione, treat a mixture of 1-diethylamino-6-m-acetoxyphenyl-hexan-3-one and 6-m-acetoxyphenylhex-1-en-3-one with 2-ethylcyclopentane - 1,3 - dione and dry methanolic potassium hydroxide solution according to the manipulative procedure described above.

To prepare 2-(6-m-hydroxyphenyl-3-oxohexyl)-2-ethyl-cyclopentane-1,3-dione, treat a mixture of 1-diethylamino-6-m-hydroxyphenyl-hexan-3-one and 6-m-hydroxyphenylhex-1-en-3-one with 2-ethylcyclopentane-1,3-dione and dry methanolic potassium hydroxide solution according to the manipulative procedure described above.

Example 31.—2-(6-m-methoxyphenyl-3-oxohexyl)-2-methylcyclopentane-1,3-dione

Add the crude methiodide of 1-diethylamino-6-m-methoxyphenyl-hexan-3-one (2.5 g.) in methanol (10 cc.) ice-cold to a solution obtained by adding 2-methylcyclopentane-1,3-dione (0.5 g.) to an ice-cold solution of sodium (0.21 g.) in methanol (10 cc.). Allow the reaction mixture to warm to room temperature and leave for 16 hours, after which add N hydrochloric acid (10 cc.), and saturated brine (100 cc.), and ether-extract the solution. Evaporate the washed and dried extracts to obtain the crude adduct 2-(6-m-methoxyphenyl-3-oxohexyl)-2-methylcyclopentane-1,3-dione as a gum.

This compound is useful as an intermediate for preparing the novel compositions of this invention having hormonal activity.

Example 32.—2-(6-m-methoxyphenyl-3-oxohexyl)-2-methylcyclopentane-1,3-dione

Reflux 6-m-methoxyphenylhex-1-en-3-one, containing a small amount of 1-diethylamino-6-m-methoxyphenyl-hexan-3-one (6 g., the material produced by the slow distillation of the latter substance), with 2-methylcyclopentane-1,3-dione (3.5 g.) in 0.12% anhydrous methanol in potassium hydroxide (10 cc.) for 10 hours. Work up the reaction mixture as described for the preparation of the compound as titled above, to obtain the crude triketone 2-(6-m-methoxyphenyl-3-oxohexyl)-2-methylcyclopentane-1,3-dione (8 g.). Distil a small portion of this at 0.02 mm. for analysis.

$C_{19}H_{24}O_4$ Calculated: C, 72.1%; H, 7.65%. Found: C, 72.3%; H, 7.45%.

This compound is useful as an intermediate for preparing the novel compositions of this invention having hormonal activity.

*Example 33.—2-(6-m-methoxyphenyl-3-oxohexyl) 2-methylcyclopentane-1,3-dione*

Add sodium (0.05 g.) to a 0.12% methanolic potassium hydroxide solution (15 cc.). To this solution add 1-bromo-6-(m-methoxyphenyl)hexan-3-one (0.9 g.) in methanol (5 cc.) and 2-methylcyclopentane-1,3-dione (0.4 g.), and reflux the mixture for 6 hours. After working up as in the preparation of the title compound in a previous example, obtain the crude Michael adduct 2-(6-m-methoxyphenyl-3-oxohexyl)-2-methylcyclopentane-1,3-dione as a yellow gum.

This compound is useful as an intermediate for preparing the novel compositions of this invention having hormonal activity.

*Example 34.—2-(6-m-methoxyphenyl-3-oxohexyl) 2-ethylcyclohexane-1,3-dione*

Reflux 2-ethylcyclohexane-1,3-dione (30.6 g.), pyridine (20 cc.), benzene (372 cc.) and a mixture of 1-diethylamino-6-m-methoxyphenylhexan-3-one and 6-m-methoxyphenylhex-1-en-3-one (40.3 g., produced by the distillation of the former substance) for 15 hours. Wash the cooled reaction mixture with water, 10% aqueous sulfuric acid, water, 10% aqueous sodium carbonate, water, and brine, and filter. Evaporate the solvent to leave as residue 2-(6-m-methoxyphenyl-3-oxohexyl)-2-ethylcyclohexane-1,3-dione (38.1 g.), 56.2%.

This compound is useful as an intermediate for the preparation of the novel compositions of this invention which have hormonal activity.

*Example 35. — 2-(6-m-methoxyphenyl-3-oxohexyl)-2-ethylcyclopentane-1,3-dione*

Reflux a mixture (5.25 g.) of 1-diethylamino-6-m-methoxyphenylhexan-3-one and 6-m-methoxyphenylhex-1-en-3-one with 2-ethylcyclopentane-1,3-dione (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m-methoxyphenyl-3-oxohexyl)-2-ethylcyclopentane-1,3-dione (7.1 g.) as a gum.

This compound is useful as an intermediate for the preparation of the novel compositions of this invention which have hormonal activity.

*Example 36.—2-isopropyl-2-(6-m-methoxyphenyl-3-oxohexyl)cyclopentane-1,3-diode*

Condense a mixture (6 g.) of 1-diethylamino-6-(m-methoxyphenyl)-hexan-3-one and 6-(m-methoxyphenyl) hex-1-en-3-one with 2-isopropylcyclopentane-1,3-dione (3 g.) using a procedure similar to that described for the condensation of the 2-ethyl compound. Obtain the corresponding triketone, 2-isopropyl-2-(6-m-methoxyphenyl-3-oxohexyl)cyclopentane-1,3-dione (7.2 g.) as an uncrystallizable gum.

This compound is useful as an intermediate for the preparation of the novel compositions of this invention which have hormonal activity.

*Example 37.—2-(6-m-methoxyphenyl-3-oxohexyl)-2-isobutyl-1,3-cyclopentanedione*

Reflux 6-m-methoxyphenylhex-1-en-3-one (126.9 g.) with 2-isobutyl-1,3-cyclopentanedione (108 g.) in 0.12% methanolic potassium hydroxide solution for 20 hours. After removing the solvent in vacuo, dissolve the residue in a mixture of benzene-ether (1:1, 600 cc.) and filter the solution. Wash the filtrate successively with sulfuric acid, sodium bicarbonate, and water, and dry. Evaporate the solvents to obtain 2-(6-m-methoxyphenyl-3-oxohexyl)-2-isobutyl-1,3-cyclopentanedione (154.9 g., 69.6%) as a gum.

This compound is useful as an termediate for the preparation of the novel compositions of this invention which have hormonal activity.

*Example 38.—2-cetyl-2-(6-m-methoxyphenyl-3-oxohexyl)-1,3-cyclopentanedione*

Reflux a mixture of 2-cetyl-1,3-cyclopentanedione (10.1 g.), m-methoxyphenylhex-1-en-3-one (6.0 g.) and 0.02% methanolic potassium hydroxide solution (120 cc.) for 26 hours and then cool. Dissolve the residue obtained after removal of solvent under reduced pressure in a mixture of benzene (50 cc.) and ether (50 cc.), and wash the solution in turn with sodium carbonate solution, 10% aqueous sulfuric acid and water. Remove the solvent by evaporation under reduced pressure to obtain as residue crude 2-cetyl-2-(6-m-methoxyphenyl-3-oxohexyl)-1,3-cyclopentanedione (11.4 g.).

This compound is useful as an intermediate for the preparation of the novel compositions of this invention which have hormonal activity.

*Example 39.—2(6-m-methoxyphenyl-3-oxoheptyl)-2-ethylcyclopentane-1,3-dione*

Reflux a mixture of 6-(m-methoxyphenyl)hept-1-en-3-one and 1-diethylamino-6-(m-methoxyphenyl)heptan-3-one (10 g., obtained by solw distillation of the latter substance) with 2-ethylcyclopentane-1,3-dione (7 g.) in 0.12% methanolic potassium hydroxide solution (40 cc.) for 15 hours. Remove most of the methanol under reduced pressure and add a mixture of equal volumes of ether and benzene (50 cc.). Wash the solution with 5% aqueous sodium hydroxide, water, 10% hydrochloric acid, and brine, and dry. Evaporate the solvent to leave as residue the triketone adduct 2-(6-m-methoxyphenyl-3-oxoheptyl)-2-ethylcyclopentane-1,3-dione (14 g.); infrared adsorption peak at $5.80\mu$.

The compound is useful as an intermediate for the preparation of the novel compositions of this invention which have hormonal activity.

*Example 40.—2-ethyl-2-(6-m-methoxyphenyl-5-methyl-3-oxohexyl)cyclopentane-1-3-dione*

Add a mixture of 1-diethylamino-6-(m-methoxyphenyl)-5-methyl-hexan-3-one and 5-methyl-6-(m-methoxyphenyl)hex-1-en-3-one (6 g., prepared by slow distillation of the former substance) to 2-ethylcyclopentane-1,3-dione (3.5 g.) in 0.12% methanolic potassium hydroxide (10 cc.) and heat the mixture under reflux for 16 hours. Remove most of the solvent under reduced pressure and add ether (25 cc.) and benzene (25 cc.) to the residue. Wash the solution with 5% aqueous sodium hydroxide, water, dilute hydrochloric acid, and brine, and dry. Evaporate the solvent to obtain a viscous brown gum, which is the triketone 2-ethyl-2-(6-m-methoxyphenyl-5-methyl-3-oxohexyl)cyclopentane-1,3-dione.

This compound is useful as an intermediate for preparing the novel compositions of this invention having hormonal activity.

*Example 41.—2-(6-phenyl-3-oxohexyl)-2-methylcyclohexane-1,3-dione*

Reflux the mixture of 1-diethylamino-6-phenylhexan-3-one and 6-phenylhex-1-en-3-one (19 g.) with 2-methylcyclohexane-1,3-dione (8.4 g.) in benzene (97 cc.) containing pyridine (7.4 cc.) for 15 hours. Wash and dry the cooled solution. Remove the solvent to obtain the crude triketone 2-(6-phenyl-3-oxohexyl)-2-methylcyclohexane-1,3-dione.

This compound is useful as an intermediate for preparing the novel compositions of this invention having hormonal activity.

*Example 42.—2-(6-phenyl-3-oxohexyl)-2-methylcyclopentane-1,3-dione*

Reflux a mixture of crude 6-phenylhex-1-en-3-one (3.3 g., obtained by slow distillation of the ketoamine 1-diethylamino-6-phenylhexan-3-one), 2-methylcyclopentane-1,3-dione (1.5 g.), and 0.12% anhydrous methanolic potassium hydroxide (5.8 cc.) for 5 hours. Remove the solvent under reduced pressure and treat the residue with water. Extract with ether. Evaporate the washed and dried ether extracts, leaving the crude triketone 2-(6-phenyl-3-oxohexyl)-2 - methylcyclopentane - 1,3-dione (6 g.) as a reddish yellow gum; infrared absorption peaks at 2.86, 3.40, 5.81, 16.39$\mu$, indicating the presence of some aldol form in equilibrium with triketone.

This compound is useful as an intermediate for preparing the novel compositions of this invention having hormonal activity.

*Example 43.—2-(6-m-nitrophenyl-3-oxohexyl)-2-methylcyclopentane-1,3-dione*

6-m-nitrophenylhex-1-en-3-one (1.0 g., containing a small amount of 1-diethylamino-6-m-nitrophenylhexan-3-one) in anhydrous 0.1% methanolic potassium hydroxide (10 cc.) with 2-methylcyclopentane-1,3-dione (1.5 g.) for 12 hours. Cool this solution, pour into water and ether-extract. Wash the extracts with sodium bicarbonate solution, dry and evaporate to obtain a gum (1.3 g.). Crystallize by adding ethanol, recrystallize from ethanol to obtain 2 - (6-m-nitrophenyl-3-oxohexyl) - 2-methylcyclopentane-1,3-dione, M.P. 81–83° C.; infrared absorption peaks at 5.70, 5.80, 6.54, 7.33$\mu$ (the first three peaks representing carbonyl groups and the others a nitro group).

This compound is useful as an intermediate for preparing the novel compositions of this invention having hormonal activity.

*Example 44.—2-(6-m-aminophenyl-3-oxohexyl)-2-methylcyclopentane-1,3-dione*

Hydrogenate 2-(6-m-nitrophenyl-3-oxohexyl)-2-methylcyclopentane-1,3-dione (0.165 g.) in ethanol (30 cc.) at atmospheric pressure using 10% palladized charcoal (0.1 g.) as catalyst. Hydrogenation will cease when hydrogen (39 cc.) equivalent to 3.2 molecular equivalents have been adsorbed. Filter and evaporate to obtain as residue a gum; infrared absorption peaks at 2.88, 2.90, 5.83, 6.21, 12.74, 14.29$\mu$, indicating the product to be 2-(6-m-aminophenyl - 3 - oxohexyl)-methylcyclopentane-1,3-dione, the corresponding triketone in which the nitro group has been reduced to a free amino group.

This compound is useful as an intermediate for preparing the novel compositions of this invention having hormonal activity.

*Example 45.—2-(6-m-acetamidophenyl-3-oxohexyl)-2-methylcyclopentane-1,3-dione*

Mix 2 - (6-m-aminophenyl-3-oxohexyl)-2-methylcyclopentane-1,3-dione with acetic anhydride (0.25 cc.) and pyridine (3 cc.) and allow to stand overnight. Add ethanol to convert excess anhydride to ethyl acetate and remove all solvent under reduced pressure to obtain as a gum 2-(6-m-acetamidophenyl-3-oxohexyl)-2-methylcyclopentane - 1,3 - dione. Infrared absorption peaks at (liquid film) 2.98–3.03$\mu$ (hydrogen bonded NH); 5.88$\mu$ carbonyl in pentane ring); 5.87$\mu$ (acylic carbonyl); 5.95 and 6.43$\mu$ (two amide bands); 6.25, 12.74, and 14.29$\mu$ (disubstituted aromatic nucleus).

This compound is useful as an intermediate for preparing the novel compositions of this invention having hormonal activity.

*Example 46.—2-(6-m-hydroxyphenyl-3-oxohexyl)-2-methylcyclopentane-1,3-dione*

Reflux 1-diethylamino-6-m-hydroxyphenylhexan-3-one (0.72 g.) with 2-methylcyclopentane-1,3-dione (0.70 g.) in 0.12% methanolic potassium hydroxide (5 cc.) for 18 hours. Remove the solvent under reduced pressure. Add chloroform (50 cc.) and wash the solution in turn with dilute sulfuric acid, saturated aqueous potassium bicarbonate, and brine, dry and evaporate the solvent. The product, an amber gum, is the adduct 2-(6-m-hydroxyphenyl-3-oxohexyl) - 2 - methylcyclopentane - 1,3-dione. Infrared absorption peaks at 2.94, 5.71, 5.83 and 5.87$\mu$. This compound is useful as an intermediate for preparing the novel compositions of this invention having hormonal activity.

*Example 47.—2-(6-m-acetoxyphenyl-3-oxohexyl)-2-methylcyclopentane-1,3-dione*

Reflux a mixture of 6-(m-acetoxyphenyl)-1-diethylaminohexan-3-one and 6-(m-acetoxyphenyl)hex-1-en-3-one (1 g.), with 2-methylcyclopentane-1,3-dione (1.5 g.) in 0.12% methanolic potassium hydroxide (6 cc.) for 18 hours. Remove methanol (2 cc.) under reduced pressure and add chloroform (60 cc.). Wash the solution in turn with dilute sulfuric acid (25 cc.), saturated potassium bicarbonate solution, and brine; dry and evaporate the solvent. The product (0.8 g.) is the adduct 2-(6-m-acetoxyphenyl - 3 - oxohexyl)-2-methylcyclopentane-1,3-dione in admixture with some of the corresponding free phenol; infrared absorption: 2.86 to 3.08 (broad low-intensity band), 5.71, 5.81, 5.85, and 8.25$\mu$.

This compound is useful as an intermediate for preparing the novel compositions of this invention having hormonal activity.

*Example 48.—2-(6-m-hydroxphenyl-3-oxohexyl)-2-n-propylcyclopentane-1,3-dione*

Heat together 2-n-propylcyclopentane-1,3-dione (13 g.), 1-diethylamino-6-m-hydroxyphenylhexan-3-one and 0.12% methanolic potassium hydroxide solution (38 cc.) under gentle reflux for 12 hours. Isolate the product to obtain the Michael adduct, 2-(6-m-hydroxyphenyl-3-oxohexyl)-2-n-propylcyclopentane-1,3-dione as a brown gum (7.18 g.).

This compound is useful as an intermediate for preparing the novel compositions of this invention having hormonal activity.

*Example 49.—2-[6-(3,4-dimethoxyphenyl)-3-oxohexyl]-2-ethylcyclopentane-1,3-dione*

Reflux 6-(3,4-dimethoxyphenyl)hex-1-en - 3 - one, containing a small amount of 6-(3,4-dimethoxyphenyl)-1-diethylaminohexan-3-one (6 g., produced by slow distillation of the latter substance) with 2-ethylcyclopentane-1,3-dione (3.5 g.) in 0.12% anhydrous methanolic potassium hydroxide (10 cc.) for 10 hours. Remove most of the methanol under reduced pressure, add benzene (25 cc.) and ether (25 cc.) and wash the solution with water, dilute aqueous potassium hydroxide, dilute hydrochloric acid and water. Dry and evaporate the solvent to give the triketone adduct 2-[6-(3,4-dimethoxyphenyl)-3-oxohexyl]-2-ethylcyclopentane-1,3-dione; infrared absorption (gum) 5.80, 6.25$\mu$ (split peak).

This compound is useful as an intermediate for preparing the novel compositions of this invention having hormonal activity.

*Example 50.—2-[6-(3,5-dimethoxyphenyl)-3-oxohexyl]-2-ethylcyclopentane-1,3-dione*

Reflux 6-(3,5-dimethoxyphenyl)hex-1-en-3-one, containing a small amount of 6-(3,5-dimethoxyphenyl)-1-diethylaminohexan-3-one (6 g., produced by slow distillation of the latter substance) with 2-ethylcyclopentane- 1,3-dione (3.5 g.) in 0.12% anhydrous methanolic potassium hydroxide (10 cc.) for 10 hours. Work up the reaction mixture as for the preparation of 2-(6-m-acetoxyphenyl-3-oxohexyl)-2-methylcyclopentane-1,3-dione to obtain 2-[6-(3,4-dimethoxyphenyl)-3-oxohexyl]-2-ethylcyclopentane-1,3-dione as a viscous gum; infrared absorption peaks at 5.80, 6.25μ (split peak).

This compound is useful as an intermediate for preparing the novel compositions of this invention having hormonal activity.

*Example 51.—Diethyl 2-(6-m-methoxyphenyl-3-oxohexyl)-2-methyl-3-oxoadipate*

Stir a mixture of diethyl 2-methyl-3-oxoadipate (2.3 g., B.P. 111–112° C./0.2 mm.), prepared from 2-methylacetoacetic ester and ethoxycarbonylpropionyl chloride by the method of Cardwell, J. Chem. Soc., 1949, 715, and the methiodide of 1-diethylamino-6-m-methoxyphenylhexan-3-one (4.6 g.) in benzene (20 cc.) in an ice bath and add a solution of potassium (0.4 g.) in ethanol (10 cc.) dropwise over 1 hour. After stirring for a further 4 hours add ether (50 cc.) and evaporate the washed and dried ether extracts. Heat the residue at 160° C. and 0.2 mm. pressure to remove unchanged starting materials. The residual gum is diethyl 2-(6-m-methoxyphenyl-3-oxohexyl)-2-methyl-3-oxoadipate (2.7 g.); infrared absorption peaks at 5.78, 5.88, 6.25, 12.82, 14.49μ.

This compound is useful as an intermediate for preparing the novel compositions of this invention which have hormonal activity.

*Example 52.—13β-methyl-3-methoxy-D-homogona-1,3,5(10),8,14-pentaen-17a-one*

Reflux the dicyclic triketone 2-(6-m-methoxyphenyl-3-oxohexyl)-2-methylcyclohexane-1,3-dione (2 g.) for 2 hours in benzene (35 cc.) containing anhydrous toluene-p-sulfonic acid (1 g.) using a Dean-Stark trap to remove the water formed. The worked-up product is a solid which one recrystallizes from light petroleum (B.P. 60–80°) and from methanol to give the pentaene 13β-methyl-3-methoxy-D-homogona-1,3,5(10),8,14-pentaene-17a-one (0.5 g.), M.P. 135–137° C.; ultraviolet absorption peak at 310 mμ (ε 30,000).

$C_{20}H_{22}O_2$ Calculated: C, 81.6%; H, 7.5%. Found: C, 81.45%; H, 7.7%.

This compound has estrogenic activity, lowers the blood lipid level, and is useful as an intermediate for preparing the hormonal compound of this invention.

*Example 53.—13β-methyl-3-methoxygona-1,3,5(10),8,14-pentaen-17-one*

Dissolve the triketone 2-(6-m-methoxyphenyl-3-oxohexyl)-2-methylcyclopentane-1,3-dione (6.7 g.), in dry benzene (100 cc.) containing anhydrous toluene-p-sulfonic acid (2.4 g.). Reflux the mixture using a Dean-Stark water separator until the equivalent of two molecular proportions of water (0.99 cc.) is collected (30 minutes), indicating a double cyclodehydration. Cool and wash to remove acid, and dry. Evaporate the dried solution to obtain a red gum. Distil the gum under reduced pressure (bath temperature 210°, 0.5 mm.). Recrystallize the solidified distillate from methanol, giving 13β-methyl-3-methoxygona-1,3,5(10),8,14-pentaen-17-one (3.9 g.), M.P. 115–116°; ultraviolet absorption peak at 313 mμ (ε 35,100). The light absorption is in agreement with the structure assigned.

$C_{19}H_{20}O_2$ Calculated: C, 81.4%; H, 7.2%. Found: C, 81.1%; H, 7.0%.

This compound has estrogenic activity, lowers the blood lipid level, and is useful as an intermediate for preparing the hormonal compound of this invention.

*Example 54.—13β-methyl-3-methoxygona-1,3,5(10),8,14-pentaen-17-one*

Add the crude methiodide of 1-diethylamino-6-m-methoxyphenylhexan-3-one (2.5 g.) in methanol (10 cc.) ice-cold to a solution obtained by adding 2-methylcyclopentane-1,3-dione (0.5 g.) to an ice-cold solution of sodium (0.21 g.) in methanol (10 cc.). Allow the reaction mixture to warm to room temperature and leave for 16 hours, after which add N hydrochloric acid (10 cc.) and saturated brine (100 cc.), ether-extracting the solution. Evaporate the washed and dried extracts to obtain crude 2-(6-m-methoxyphenyl-3-oxohexyl)-2-methylcyclopentane-1,3-dione as a gum; dissolve in benzene (25 cc.) containing toluene-p-sulfonic acid (0.4 g.) and reflux the mixture for 1 hour. Cool, add ether (25 cc.), and wash, dry, and evaporate the solution. Take up the resulting gum in benzene (5 cc.) and adsorb on a column of fuller's earth (100 g.). Elute with a mixture of benzene and light petroleum to obtain a series of fractions, one of which crystallizes (0.04 g.). Boil this fraction with methanol and decant the solution from insoluble oil which forms. Reduce the solution in bulk by evaporation, depositing crystals on cooling: recrystallize from methanol to obtain 13β-methyl-3-methoxygona-1,3,5(10),8,14-pentaen-17-one, M.P. 111–113° C.; ultraviolet absorption peak at 312 mμ (ε 34,800).

This compound has estrogenic activity, lowers the blood lipid level, and is useful as an intermediate for preparing the hormonal compounds of this invention.

*Example 55.—13β-methyl-3-methoxygona-1,3,5(10),8,14-pentaen-17-one*

To 2-(6-m-methoxyphenyl-3-oxohexyl)-2-methylcyclopentane-1,3-dione (3 g.) in benzene (100 cc.), polyphosphoric acid (from orthophosphoric acid, 15 g., and phosphorus pentoxide, 6 g.) and heat the mixture at 90° for 4 minutes under such reduced pressure as the need to control frothing will allow. Cool, add water, and extract the mixture with ether and ethyl acetate; isolate the product from the resulting solution to obtain the colorless crystalline 13β-methyl-3-methoxygona-1,3,5(10),8,14-pentaen-17-one (2 g.), M.P. 115–116°; ultraviolet absorption peak at 313 mμ (ε 35,100).

To prepare 13β-(3-hydroxypropyl)-3-methoxygona-1,3,5(10),8,14-pentaen-17-one treat 2-(6-m-methoxyphenyl-3-oxohexyl)-2-(3-hydroxypropyl)cyclopentane-1,3-dione with polyphosphoric acid according to the manipulative procedure described above.

To prepare 13β-phenethyl-3-propoxygona-1,3,5(10),8,14-pentaen-17-one treat 2-(6-m-propoxyphenyl-3-oxohexyl)-2-phenethylcyclopentane-1,3-dione with polyphosphoric acid according to the manipulative procedure described above.

To prepare 13β-isobutyl-3-pentyloxygona-1,3,5(10),8,14-pentaen-17-one treat 2-(6-m-pentyloxyphenyl-3-oxohexyl)-2-isobutylcyclopentane-1,3-dione with polyphosphoric acid according to the manipulative procedure described above.

To prepare 13β-(3-hydroxypropyl)-3-cyclopentyloxygona-1,3,5(10),8,14-pentaen-17-one treat 2-(6-m-cyclopentyloxyphenyl-3-oxohexyl)-2-(3-hydroxypropyl)cyclopentene-1,3-dione with polyphosphoric acid according to the manipulative procedure described above.

To prepare 13β-phenethyl-3-hydroxygona-1,3,5(10),8,14-pentaen-17-one treat 2-(6-m-hydroxyphenyl-3-oxohexyl)-2-phenethylcyclopentane1,3-dione with polyphosphoric acid according to the manipulative procedure described above.

To prepare 13β-(2-diethylaminoethyl)-2,3-dimethoxygona-1,3,5(10),8,14-pentaen-17-one treat 2-[6-(3,4-dimethoxyphenyl)-3-oxohexyl]-2-(2-diethylaminoethyl)cyclopentane-1,3-dione with polyphosphoric acid according to the manipulative procedure described above.

To prepare 13β-(3-dimethylaminopropyl)-1,3-dimethoxy-6-methylgona-1,3,5(10),8,14-pentaen-17-one treat 2-[6-(3,5-dimethoxyphenyl)-3-oxoheptyl]-2(3-dimethylaminopropyl)cyclopentane-1,3-dione with polyphosphoric acid according to the manipulative procedure described above.

To prepare 13β-butyl-1,3-diethoxy-6-ethylgona-1,3,5(10), 8,14-pentaen - 17-one treat 2-[6-(3,5-diethoxyphenyl)-3-oxooctyl]-2-butyl-cyclopentane - 1,3-dione with polyphosphoric acid according to the manipulative procedure described above.

To prepare 13β-propyl-2 - ethoxy-3-methoxygona-1,3,5 (10),8,14-pentaen-17-one treat 2-[6-(3-methoxy-4-ethoxyphenyl)-3-oxohexyl]-2-propylcyclopentane-1,3-dione with polyphosphoric acid according to the manipulative procedure described above.

These compounds have estrogenic activity, lower the blood lipid level, and are useful as intermediates in the preparation of the hormonal compounds of the invention.

*Example 56.—13β-methyl-3-methoxygona-1,3,5(10), 8,14-pentaen-17-one*

Heat the tricyclic diketone 5,6,7,8 - tetrahydro - 4-m-methoxyphenethyl - 8-methylindane-1,5-dione (0.25 g.), under nitrogen at 60° with a mixture of orthophosphoric acid (5 cc., sp. gr. 1.8) and phosphorus pentoxide (3.25 g.) for 20 minutes. Work up by means of ether to obtain a partially crystalline product which one takes up in benzene (10 cc.) and filters. Recrystallize the residue to obtain the diene 13β-methyl-3-methoxygona-1,3,5(10), 8,14-pentaen-17-one (0.6 g.), M.P. 110–112° C.; ultraviolet absorption peaks at 310 mμ (ε 37,200); infrared absorption peak at 5.78μ.

This compound has estrogenic activity, lowers the blood lipid level, and is useful as an intermediate for preparing the hormonal compounds of this invention.

*Example 57.—13β-ethyl-3-methoxy-D-homogona-1,3, 5(10),8,14-pentaen-17a-one*

Add 2-(6 - m-methoxyphenyl-3-oxohexyl)-2-ethylcyclohexane-1,3-dione (32.8 g.) in benzene (400 cc.) to polyphosphoric acid (150 g.) in an atmosphere of nitrogen and stir the mixture at 60° for 3 hours. Add water, separate the benzene layer and wash with water until neutral. Dry the solution, remove the solvent, and recrystallize the residue from ethanol to obtain 13β-ethyl-3-methoxy - D - homogona-1,3,5(10),8,14-pentaen-17a-one, M.P. 90–92°; ultraviolet absorption peak at 311 mμ (ε 28,500).

This compound has estrogenic activity, lowers the blood lipid level, and is useful as an intermediate for preparing the hormonal compounds of this invention.

*Example 58.—13β-ethyl-3-methoxygona-1,3,5(10), 8,14-pentaen-17-one*

Reflux the triketone 2-ethyl-2-(6-m-methoxyphenyl-3-oxohexyl)-cyclopentane-1,3-dione (7.1 g.), in benzene (150 cc.) and toluene-p-sulfonic acid (2 g.) until the theoretical amount of water (0.72 cc.) for double cyclodehydration has been collected in a Dean-Stark separator. Wash the cooled reaction mixture after removal of solvent under reduced pressure, B.P. ca. 220°/0.01 mm., to obtain an almost colorless glass (5.7 g.). Crystallize the glass from methanol containing a little ethyl acetate to obtain pure 13β-ethyl - 3 - methoxygona-1,3,5(10),8,14-pentaen-17-one (3.7 g.), M.P. 77–80°; ultraviolet absorption peak at 311 mμ (ε 28,000).

$C_{20}H_{22}O_2$ Calculated: C, 81.6%; H, 7.5%. Found: C, 81.3%; H, 7.3%.

This compound has estrogenic activity, lowers the blood lipid level, and is useful as an intermediate for preparing the hormonal compounds of this invention.

*Example 59.—13β-propyl-3-methoxygona-1,3,5(10), 8,14-pentaen-17-one*

Condense 2-propylcyclopentane-1,3-dione (13.1 g.) in 0.12% methanolic potassium hydroxide solution (90 cc.) with 6-m-methoxy-phenylhex-1-en-3-one (19.0 g.), to obtain crude 2-n-propyl-2-(6-m-methoxyphenyl-3-oxohexyl) cyclopentane-1,3-dione (25.5 g.). Submit this Michael condensation product (23.4 g.) to double cyclohydration by heating with toluene-p-sulfonic acid, and distil the product at 200°/10⁻⁴ mm.; crystallize the distillate from ethanol to obtain the tetracyclic ketone 13β-propyl-3-methoxygona-1,3,5(10),8,14-pentaen-17-one, M.P. 82–84°; ultraviolet absorption peak at 310 mμ (ε 24,700).

This compound has estrogenic activity, lowers the blood lipid level, and is useful as an intermediate for preparing the hormonal compounds of this invention.

*Example 60.—3-methoxy-13-propyl-D-homogona-1,3,5(10),8,14-pentaen-17a-one*

Cyclodehyrate 43 g. 2-(6-m-methoxyphenyl-3-oxohexyl)-2-propylcyclohexane-1,3-dione with polyphosphoric acid to obtain the title product (27.6 g.), M.P. 86–89°, upon recrystallization from ethanol; ultraviolet 312 mμ (ε 24,300).

Calculated: C, 81.95%; H, 8.13%. Found: C, 82.11%; H, 8.18%.

*Example 61.—13β-isopropyl-3-methoxygona-1,3,5(10), 8,14-pentaen-17-one*

Reflux the triketone 2-isopropyl-2-(6-m-methoxyphenyl-3-oxohexyl)cyclopentane-1,3-dione (7.2 g.) in benzene (150 cc.) and toluene-p-sulfonic acid (2.0 g.) until the theoretical amount of water (0.72 cc.) for double cyclodehydration has been collected in a Dean-Stark trap. Wash the cooled reaction mixture to remove acid and dry. Remove the solvent to obtain a gum. Distil the gum to obtain a glass (5 g.), which one crystallizes from methanol to obtain pure 13β-isopropyl-3-methoxygona-1,3,5(10),8,14-pentaen-17-one (4.5 g.), M.P. 112–113°.

$C_{21}H_{24}O_2$ Calculated: C, 81.8%; H, 7.8%. Found: C, 8.8%; H, 7.6%.

This compound has estrogenic activity, lowers the blood lipid level, and is useful as an intermediate for preparing the hormonal compounds of this invention.

*Example 62.—13β-butyl-3-methoxygona-1,3,5(10),8,14-pentaen-17-one*

Condense 2-n-butylcyclopentane-1,3-dione (2.8 g.) in 0.12% methanolic potassium hydroxide solution (8 cc.) with 6-m-methoxyphenylhex-1-en-3-one (5 g.) by heating the mixture at 80° for 10 hours. Evaporate the solvent under reduced pressure and heat the residue with toluene-p-sulfonic acid (2 g.) in benzene (50 cc.) for 45 minutes using a Dean-Stark trap to effect double cyclodehydration. Add ether to the cooled reaction mixture, and evaporate the washed and dried ether solution; recrystallize the residue from ethanol to obtain 13β-butyl-3-methoxygona-1,3,5(10),8,14-pentaen-17-one (1.9 g.), M.P. 53–55°; ultraviolet absorption peak at 312 mμ (ε 29,200).

This compound has estrogenic activity, lowers the blood lipid level, and is useful as an intermediate for preparing the hormonal compounds of this invention.

*Example 63.—13β-isobutyl-3-methoxygona-1,3,5(10),8,14-pentaen-17-one*

Reflux a mixture of crude 2-(6-m-methoxyphenyl-3-oxohexyl)-2-isobutyl - 1,3 - cyclopentanedione (154.9 g.) and anhydrous p-toluenesulfonic acid (177 g.) in 5.2 liters of dry benzene for 3 hours using a Dean-Stark water separator. After cooling, filter the solution, wash, dry, and concentrate to ⅓ of its volume. Then filter through charcoal (Darco, 310 g.). Distil the filtrate to obtain a viscous oil, B.P. 203° (bath temperature)/0.01 mm. Recrystallize from methanol-acetone to get 13β-isobutyl-3-methoxygona-1,3,5(10),8,14-pentaen-17-one, M.P. 57–60°; ultraviolet absorption peak at 312 mμ (ε 25,200).

$C_{22}H_{26}O_2$ Calculated: C, 81.9%; H, 8.1%. Found: C, 81.6%; H, 8.1%.

This compound has estrogenic activity, lowers the blood lipid level, and is useful as an intermediate for preparing the hormonal compounds of this invention.

Example 64.—13-isopentyl-3-methoxygona-1,3,5(10),8,14-pentaen-17-one

Cyclodehydrate 2 - isopentyl-2-(6-m-methoxyphenyl-3-oxohexyl)-cyclopentane-1,3-dione (50 g.) at room temperature with p-toluenesulfonic acid. After two distillations, there is obtained 15.8 g. (35%) of the title product; ultraviolet 315 mμ (ε 18,040).

$C_{23}H_{28}O_2$ Calculated: C, 82.39%; H, 8.32%. Found: C, 82.12%; H, 8.14%.

Example 65.—13β-cetyl-3-methoxygona-1,3,5(10),8,14-pentaen-17-one

Reflux a mixture of 2-cetylcyclopentane-1,3-dione (10.1 g.), 6-m-methoxyphenylhex-1-en-3-one (6.0 g.) and 0.02% methanolic potassium hydroxide solution (120 cc.) for 26 hours and then cool. Dissolve the residue obtained after removal of solvent under reduced pressure in a mixture of benzene (50 cc.) and ether (50 cc.), and wash the solution in turn with sodium carbonate solution, 10% aqueous sulfuric acid and water. Remove the solvent by evaporation under reduced pressure to obtain as residue crude 2-cetyl-2-(6-m-methoxyphenyl-3-oxohexyl)-1,3-cyclopentanedione (11.4 g.).

Add a solution of this Michael condensate in dry benzene (80 cc.) to a mixture of anhydrous toluene-p-sulfonic acid (2.4 g.) and dry benzene (80 cc.) and reflux the mixture for 1 hour, using a Dean-Stark water separator, until the equivalent of 2 moles of water (0.75 cc.) has been collected. Wash the cooled solution, dry, and remove the solvent, leaving a purple oil (10.2 g.) which one then distills at about 220°/0.001 mm. Recrystallize the solidified distillate from acetonitrile, to obtain 13β-cetyl-3-methoxygona-1,3,5(10),8,14-pentaen-17-one, M.P. 55–56° C.; ultraviolet absorption peak at 316 mμ (ε 24,000).

$C_{34}H_{50}O_2$ Calculated: C, 83.2%; H, 10.3%. Found: C, 83.3%, H, 10.3%.

This compound has estrogenic activity, lowers the blood lipid level, and is useful as an intermediate for preparing the hormonal compounds of this invention.

Example 66.—3-methoxy-6α,13-dimethylgona - 1,3,5(10), 8,14-pentaen - 17 - one and 3-methoxy-6β,13-dimethyl-gona-1,3,5(10),8,14-pentaen-17-one Cyclize 60 g. 2-(6-m-methoxyphenyl-3-oxoheptyl)-2-methylcyclo-pentane-1,3-dione with p-toluenesulfonic acid in benzene. After distillation of the crude product, there was obtained 43 g. of a gum which was crystallized from methanol to give 23 g. of material, M.P. 75–90°. Repeated crystallization finally gave 11 g. 6β-methyl epimer, M.P. 112–115°. The mother liquors of the first recrystallization afforded 200 mg. of the 6α-methyl epimer, M.P. 109–111°.

Example 67.—13-ethyl-3-methoxy-6-methylgona-1,3,5(10),8,14-pentaen-17-one

Hydrate 1-diethylamino-6-m-methoxyphenylhept -2-yne and distill to obtain 6-m-methoxyphenylhept-1-en-3-one. Condense this material with 2-ethylcyclopentane-1,3-dione and cyclize the resulting intermediate with p-toluenesulfonic acid to obtain the title product; ultraviolet 315 mμ (ε 21,000).

This compound has estrogenic activity, lowers the blood lipid level, and is useful as an intermediate for preparing the hormonal compounds of this invention.

Example 68.—13-ethyl-3-methoxy-7-methylgona-1,3,5(10),8,14-pentaen-17-one

Stir a mixture of 0.5 g. p-toluenesulfonic acid and 1 g. 13-ethyl - 3 - methoxy-7-methyl-8,14-secogona-1,3,5(10), 9(11)-tetraene-14,17-dione in 50 ml. benzene at room temperature for two hours. Cool, filter, wash with water and brine, dry, and evaporate to obtain 0.8 g. of the title product; infrared 5.75μ; ultraviolet 236 mμ (ε 13,650), 313 mμ (ε 28,600).

This compound has estrogenic activity, lowers the blood lipid level, and is useful as an intermediate for preparing the hormonal compounds of this invention.

Example 69.—3-methoxy-11β,13-ethano-d-homogona-1,3,5(10),8,14-pentaene-17α,18α-dione Reflux 2-carbethoxymethyl-1,3-cyclohexanedione monohydrate (6.0 g.) in 50 ml. benzene, removing the water formed by means of a Dean-Stark head. Add 2.6 ml. pyridine and 5.25 g. 6-m-methoxyphenylhex-1-en-3-one and reflux for twenty hours. Work up in the conventional manner to yield 2-carbethoxymethyl-2-(6-m-methoxyphenyl-3-oxohexyl)cyclohexane-1,3-dione (6.1 g.); infrared 5.77, 5.89μ. Reflux this compound (4 g.) in 200 ml. benzene for one and one-half hours with vigorous stirring in the presence of 25 g. polyphosphoric acid. Decompose the black reaction mixture with water, and wash the yellow benzene layer with water until neutral. Evaporate the solvent to obtain a dark red gum, which crystallizes on scratching. Recrystallize from ethanol-ether to obtain a bright yellow solid (1.5 g.), M.P. 153–156°; infrared 5.76, 5.84μ; ultraviolet 320 mμ (ε 27,000).

Example 70.—13-carbethoxy-3-methoxygona-1,3,5(10), 8,14-pentaene

Treat 1 - diethylamino-6-m-methoxyphenylhexan-3-one (8.4 g.) with excess methyl iodide, controlling the exothermic reaction by external cooling. Remove the excess methyl iodide under reduced pressure, wash the gummy product with a little ether, and dry at 100°/16 mm. to give diethyl 6-m-methoxyphenyl-3-oxohexyl tri-methyl ammonium iodide (13.5 g.) which one stirs with 2-carbethoxycyclopentanone (4.68 g.) in benzene (100 cc.) at 0° and potassium ethoxide (from the metal 1.27 g.) in ethanol (20 cc.) added dropwise over 45 minutes to the stirred solution. Stir the mixture for 2 hours at 0° and then at 20° for 16 hours. Add ether and water and wash the organic layer with ice-cold aqueous 2 N sodium hydroxide (3×50 cc.), water, dilute hydrochloric acid, and brine and dry. Evaporate the solvent to give an oil (10.8 g.). Reflux an aliquot (1.5 g.) in benzene (50 cc.) with p-toluenesulfonic acid (1 g.) for 1 hour. Wash the cooled solution with water, dry and evaporate to give a gum which one chromatographs on neutral alumina (50 g.). Elute with light petroleum-benzene (4:1) and (1:1) to obtain a series of crystalline fractions which one combines and recrystallizes from methanol to give the title product (0.162 g.), M.P. 60–63°; λ maximum 313 mμ (ε 28,588); ν maximum 1720 cm.$^{-1}$.

Example 71.—13-hydroxymethyl-3-methoxygona-1,3,5(10),8,14-pentaene

Treat 13 - carbethoxy-3-methoxygona-1,3,5(10),8,14-pentaene (0.225 g.) in ether (15 cc.) with lithium aluminum hydride (0.25 g.). After 10 minutes, add ethanol and water dropwise to decompose excess reagent. Add Celite and anhydrous magnesium sulfate, filter the mixture, and evaporate. Recrystallize the residue from light petroleum containing a little ethanol to give the title product (0.108 g.), M.P. 107–110°, raised to 111–113° by further recrystallization; λ maximum 312 mμ (ε 23,700); ν maximum 3300, 1600, 1250, 1035 cm.$^{-1}$.

Example 72.—13-hydroxymethyl-3-methoxygona-1,3,5 (10),8,14-pentaene, p-toluenesulfonate Treat 13 - hydroxymethyl-3-methoxygona-1,3,5(10),8, 14-pentaene (0.112 g.) in pyridine (0.25 cc.) with p-toluenesulfonyl chloride (0.128 g.) and allow the mixture to stand at 20° for 16 hours. Add water and extract the mixture with chloroform. Wash the organic extract, dry, and evaporate. Recrystallize the residue from ethyl acetate-ethanol to give the title product (0.068 g.), M.P. 128–129° d.; λ maximum 312 mμ (ε24,000); ν maximum 1600, 1170, 950, 840 cm.$^{-1}$.

$C_{27}H_{28}O_4S$ Calculated: C, 72.3%; H, 6.29%. Found: C, 72.0%; H, 6.55%.

*Example 73.—13β-methyl-3-hydroxygona-1,3,5(10)8,14-pentaen-17-one*

Reflux 2 - (6-m-hydroxyphenyl-3-oxohexyl)-2-methylcyclopentane-1,3-dione (0.5 g.), the product of Michael condensation of 2-methylcyclopentane-1,3-dione with 6-m-hydroxyphenyl-1-diethylaminohexan-3-one, for 50 minutes in benzene (30 cc.) containing toluene-p-sulfonic acid (0.3 g.) using a Dean-Stark trap. Add ether (80 cc.) to the cooled product and filter off the resulting insoluble material. Wash the ethereal solution in turn with water, saturated aqueous potassium bicarbonate, and brine, and dry. The product is a deep green gum which one takes up in a small quantity of ether; precipitate the insoluble impurities by the addition of light petroleum and filter off. Evaporate the resulting solution to obtain a crystalline residue, which one takes up in a mixture of benzene (10 cc.) and ether (2 cc.); adsorb the solution on an activated Fuller's earth (10 g.). Elute with benzene to obtain 13β-methyl-3-hydroxygona-1,3,5(10),8,14-pentaen-17-one (0.19 g.), M.P. 225° (decomp.).

$C_{18}H_{18}O_2$ Calculated: C, 81.2%; H, 6.8%. Found: C, 80.7%; H, 7.0%.

This compound has estrogenic activity, lowers the blood lipid level, and is useful as an intermediate for preparing the hormonal compounds of this invention.

*Example 74.—13β-methyl-3-hydroxygona-1,3,5(10),8,14-pentaen-17-one*

Allow 2-(6-m-hydroxyphenyl - 3 - oxohexyl)-2-methylcyclopentane-1,3-dione (0.8 g.) to stand for 90 minutes at room temperature in benzene (80 cc.) containing anhydrous toluene-p-sulfonic acid (5 g). Wash the product with water, followed by aqueous sodium bicarbonate solution, and dry. Remove the solvent by evaporation to obtain a deep green gum; ultraviolet absorption peak at 313 mμ (ε13,000). When this gum is seeded it becomes solid. Take up the crude material in benzene (15 cc.) and adsorb the solution on an activated Fuller's earth (30 g.); elute with benzene to obtain pale yellow 13β-methyl-3-hydroxygona-1,3,5(10),8,14-pentaen - 17 - one (0.6 g.).

This compound has estrogenic activity, lowers the blood lipid level, and is useful as an intermediate for preparing the hormonal compounds of this invention.

*Example 75.—13β-methyl-3-hydroxygona-1,3,5(10),8,14-pentaen-17-one*

Reflux 2 - (6 - m-acetoxyphenyl-3-oxohexyl)-2-methylcyclopentane-1,3-dione (0.8 g., the product of Michael condensation of 2-methylcyclopentanedione and a mixture of 6-m-acetoxyphenyl-1-diethylaminohexan-3-one and 6-m-acetoxyphenylhex-1-en-3-one, and containing some of the corresponding free phenolic compound) in benzene (25 cc.) with toluene-p-sulfonic acid (0.3 g.) for 50 minutes. On cooling add ether (50 cc.) and wash the mixture in turn with water, saturated aqueous potassium bicarbonate, and brine; dry over anhydrous magnesium sulfate. The residue after removal of solvent is a purple gum (0.6 g.), part of which can be induced to crystallize. Dissolve a portion (0.45 g.) of this gum in benzene and adsorb on an activated Fuller's earth (40 g.); elute with benzene to obtain 13β-methyl-3-hydroxygona-1,3,5(10), 8,14-pentaen-17-one, which one recrystallizes from diisopropyl ether, M.P. 225–226°; ultra-violet absorption peak at 312.5 mμ (ε23,000); infrared absorption peaks at 2.99μ, 5.81μ, and 8.00μ.

This compound has estrogenic activity, lowers the blood lipid level, and is useful as an intermediate for preparing the hormonal compounds of this invention.

*Example 76.—13β-methyl-3-hydroxygona-1,3,5(10), 8,14-pentaen-17-one*

Place 300 g. of warm polyphosphoric acid in a one liter flask fitter with dropping funnel, stirrer and thermometer. Add crude 2-(6-m-hydroxyphenyl - 3 - oxohexyl)-2-methylcyclopentane - 1,3 - dione Michael adduct (28.3 g.), dissolved by warming in dry benzene (70 cc.) dropwise with stirring during 45 minutes to the acid at 40–50°. Stir the mixture for a further 45 minutes by which time it becomes a very deep red. Add crushed ice with vigorous stirring and extract the resulting mixture with ether (3×250 cc.). A small quantity of black tar remains insoluble in either phase. Wash the combined ethereal extracts with saturated $KHCO_3$ and brine, and then dry ($MgSO_4$). Remove the solvent on the rotary evaporator (temperature not greater than 40°) to obtain a bright yellow crystalline solid. Wash by decantation with cold 20% ethyl acetate 60–80° petroleum ether (20 cc.), filter and dry to obtain crude 13β-methyl-3-hydroxygona - 1,3,5(10),8,14-pentaen-17-one (19.35 g., 77%), M.P. 160–162° (dec.); ultraviolet absorption peak at 312 mμ (ε22,200).

This compound has estrogenic activity, lowers the blood lipid level, and is useful as an intermediate for preparing the hormonal compounds of this invention.

*Example 77.—13β-methyl-3-acetoxygona-1,3,5(10), 8,14-pentaen-17-one*

Mix 13β-methyl - 3 - hydroxygona-1,3,5(10),8,14-pentaen-17-one with pyridine (3 cc.) and acetic anhydride (1 cc.) and keep at room temperature for 4 hours. Add ethanol (1 cc.) and remove low-boiling material under reduced pressure (0.1 mm.) to leave a red gum which crystallizes from a mixture of ethyl acetate and light petroleum. Recrystallize from methanol to obtain crystals of 13β-methyl-3-acetoxygona-1,3,5(10),8,14-pentaen - 17-one, melting partially at 161–166° with resolidification at about 220° and finally melting at 260–265° (decomp.); infrared absorption peaks at 5.75μ and 8.27μ, with absence of an absorption band due to a hydroxy group; ultraviolet absorption peak at 307.5 mμ (ε24,000).

This compound has estrogenic activity, lowers the blood lipid level, and is useful as an intermediate for preparing the hormonal compounds of this invention.

*Example 78.—13β-ethyl-3-hydroxygona-1,3,5(10), 8,14-pentaen-17-one*

Reflux 2-(6-m-hydroxyphenyl-3-oxohexyl) - 2 - ethylcyclopentane-1,3-dione (2.6 g.) for 30 minutes in benzene (70 cc.) containing toluene-p-sulfonic acid (0.38 g.), and collect the water evolved in the cyclodehydration in a Dean-Stark separator. Work up to obtain a green gum which one dissolves in benzene (30 cc.); adsorb the benzene solution on a column of activated Fuller's earth, and elute with benzene to obtain crude 13β-ethyl-3-hydroxygona-1,3,5(10),8,14-pentaen-17-one (0.75 g.), as pale yellow crystals, M.P. 153–156°; ultraviolet absorption peak at 313.5 mμ (ε30,300); infrared absorption peaks at 3.99μ and 5.81μ.

This compound has estrogenic activity, lowers the blood lipid level, and is useful as an intermediate for preparing the hormonal compounds of this invention.

*Example 79.—13β-ethyl-3-hydroxygona-1,3,5(10), 8,14-pentaen-17-one*

Allow 2-(6-m-hydroxyphenyl-3-oxohexyl) - 2 - ethylcyclopentane-1,3-dione (8.8 g.) to stand 24 hours at room temperature in solution in benzene (430 cc.) containing anhydrous toluene-p-sulfonic acid (20 g.). Work up the product to obtain a deep red and green gum; take up in benzene (50 cc.) and adsorb on activated Fuller's earth (300 g.). Elute with benzene to obtain pale green crystals of crude 13β - ethyl-3-hydroxygona-1,3,5(10),8,14-pentaen-17-one (2.05 g.), M.P. 149–151°, the substance melting to a clear liquid on rapid heating; ultraviolet absorption peak at 314 mμ (ε30,000).

This compound has estrogenic activity, lowers the blood lipid level, and is useful as an intermediate for preparing the harmonal compounds of this invention.

*Example 80.—13β-ethyl-3-hydroxygona-1,3,5(10),8,14-pentaen-17-one*

Add 2-(6-m-hydroxyphenyl-3-oxohexyl)-2-ethylcyclopentane-1,3-dione (28.3 g.) in benzene (70 cc.) during 45 minutes to polyphosphoric acid (300 g., containing 80% phosphorous pentoxide) and maintain at 40–50°, with stirring. Stir the reaction mixture for a further 45 minutes during which it develops a deep red coloration. Add crushed ice and extract the product with ether. Evaporate the washed and dried extracts at a temperature not greater than 40° to obtain a bright yellow crystalline solid; wash by decantation with light petroleum containing a small proportion of ether; filter and dry to obtain 13β-ethyl-3-hydroxygona-1,3,5(10),8,14-pentaen-17-one (19.35 g.), M.P. 160–162°; ultraviolet absorption peak at 312 mμ (ε22,200).

This compound has estrogenic activity, lowers the blood lipid level, and is useful as an intermediate for preparing the hormonal compounds of this invention.

*Example 81.—13β-ethyl-3-hydroxygona-1,3,5(10),8,14-pentaen-17-one*

Add a solution of 2-(6-m-acetoxyphenyl-3-oxohexyl)-2-ethylcyclopentane-1,3-dione (18.0 g.) in benzene (40 cc.) during 1½ hours to stirred polyphosphoric acid (180 g., containing 80% phosphorous pentoxide) and maintain at 40–42°. Keep the reaction mixture at this temperature for a further hour with occasional stirring, add ice and water, and extract the product with ether. Evaporate the washed and dried extracts under reduced pressure to obtain a crude solid product (13.4 g.), containing 13β-ethyl-3-hydroxygona-1,3,5(10),8,14-pentaen-17-one and its 3-acetate in a proportion indicated by spectroscopic analysis to be 7:3; ultraviolet absorption peak at 312 mμ (ε12,700).

This 3-hydroxy compound has estrogenic activity, lowers the blood lipid level, and is useful as an intermediate for preparing the hormonal compounds of this invention.

*Example 82.—13β-ethyl-3-acetoxygona-1,3,5(10),8,14-pentaen-17-one*

Dissolve 13β-ethyl-3-hydroxygona-1,3,5(10),8,14-pentaen-17-one (2.45 g.) in pyridine (7 cc.) and acetic anhydride (4 cc.) and allow to stand at room temperature for 16 hours. Remove the solvent under reduced pressure, add ethanol (20 cc.) and again evaporate the solvent. Recrystallize the residue from ethanol to give a red crystalline solid, M.P. 122–124°. Filter the solid through "Florisil" (100 g.) with benzene, evaporate the solvent and recrystallize the product from ethanol to obtain 13β-ethyl-3-acetoxygona-1,3,5(10),8,14-pentaen-17-one, M.P. 129–130° C.; ultraviolet absorption peak at 306 mμ (ε25,500), infrared absorption peaks at 5.78μ, 8.27μ and 9.85μ.

$C_{21}H_{22}O_3$ Calculated: C, 78.25%; H, 6.9%. Found: C, 78.4%; H, 6.65%.

This compound has estrogenic activity, lowers the blood lipid level, and is useful as an intermediate for preparing the hormonal compounds of this invention.

*Example 83.—13-ethyl-3-hydroxygona-1,3,5(10),8,14-pentaen-17-one phosphate*

Treat 13-ethyl-3-hydroxygona-1,3,5(10),8,14-pentaen-17-one in pyridine with phosphonyl chloride at −10° for one hour and work up conventionally to obtain the title product.

*Example 84.—13β-propyl-3-hydroxygona-1,3,5(10),8,14-pentaen-17-one*

Cyclodehydrate 2-(6-m-hydroxyphenyl-3-oxohexyl)-2-n-propylcyclopentane-1,3-dione (7.18 g.) by heating in benzene (210 cc.) containing toluene-p-sulfonic acid (0.75 g.), to obtain a deep green gum (6.4 g.); chromatograph in benzene on a column of activated fuller's earth, to give a yellow gum. Crystallize from ethanol, and then from a mixture of benzene and light petroleum to obtain 13β-propyl-3-hydroxygona-1,3,5(10),8,14-pentaen-17-one (0.59 g.), M.P. 149–155° with some premelting at 135–138°; ultraviolet absorption peak at 313 mμ (ε27,000).

This compound has estrogenic activity, lowers the blood lipid level, and is useful as an intermediate for preparing the hormonal compounds of this invention.

*Example 85.—2,3-dimethoxy-13-methylgona-1,3,5(10),8,14-pentaen-17-one*

Dissolve 6.1 g. 6,7-dimethoxy-1-tetralone in 50 ml. tetrahydrofuran and add to 400 ml. of 2 moles vinyl magnesium chloride in tetrahydrofuran at room temperature. Let stand for 3–4 hours, and pour into saturated ammonium chloride solution. Extract with ether, wash with water, dry, and evaporate to obtain 1,2,3,4-tetrahydro-6,7-dimethoxy-1-vinyl-1-naphthol. Dissolve in 30 ml. methanol and add to 4 g. 2-methylcyclopentane-1,3-dione in 5 ml. methanol, containing a trace of potassium hydroxide. Reflux for 3 hours, cool, pour into water, and extract with ether. Wash the extracts with sodium bicarbonate and water, dry, and evaporate to obtain 2,3-dimethoxy-13-methyl-8,14-secogona-1,3,5(10),9(11)-tetraene-14,17-dione. Recrystallize from methanol to obtain 5.45 g., M.P. 104–106°.

$C_{20}H_{24}O_4$ Calculated: C, 73.12%; H, 7.37%. Found: C, 73.37%; H, 7.14%.

Dissolve 1 g. of this seco compound in 15 ml. refluxing methanol. While boiling, add conc. hydrochloric acid dropwise until the solution becomes turbid. Remove the turbidity with a few drops of tetrahydrofuran and boil for 5 minutes, after which time crystals appear. Cool, filter off the solid, wash with methanol, and recrystallize from ethanol to obtain 450 mg. of the title product, M.P. 137–140°.

$C_{20}H_{22}O_3$ Calculated: C, 77.39%; H, 7.11%. Found: C, 77.17%; H, 7.05%.

*Example 86.—13β-ethyl-2,3-dimethoxygona-1,3,5(10),8,14-pentaen-17-one*

Dissolve the crude triketone 2-[6-(3,4-dimethoxyphenyl)-3-oxohexyl]-2-ethylcyclopentane-1,3-dione (6.5 g.) in dry benzene (100 cc.) containing anhydrous toluene-p-sulfonic acid (2.4 g.) and reflux under a Dean-Stark water separator for 45 minutes. Wash the cooled solution with water, sodium carbonate solution, and water, and dry. Evaporate the solvent and distil the red gummy residue at 220° (bath temperature) 0.01 mm. to give a yellow gum; recrystallize from methanol to obtain 13β-ethyl-2,3-dimethoxygona-1,3,5(10),8,14-pentaen-17-one; ultraviolet absorption peak at 314 mμ (ε29,000); infrared absorption peaks at 5.84μ and 8.00μ.

This compound has estrogenic activity, lowers the blood lipid level, and is useful as an intermediate for preparing the hormonal compounds of this invention.

*Example 87.—31-ethyl-1,3-dimethoxygona-1,3,5(10),8,14-pentaen-17-one*

Using the triketone 2-[6-(3,5-dimethoxyphenyl)-3-oxohexyl]-2-ethylcyclopentane-1,3-dione (6.5 g.), proceed exactly as described in the preceding example to obtain 13β-ethyl-1,3-dimethoxygona-1,3,5(10),8,14-pentaen-17-one; infrared absorption peaks at 5.74μ and 8.00μ.

This compound has estrogenic activity, lowers the blood lipid level, and is useful as an intermediate for preparing the hormonal compounds of this invention.

*Example 88.—13β-ethyl-3-ethoxygona-1,3,5(10),8,14-pentaen-17-one*

Dissolve 13β-ethyl-3-hydroxygona-1,3,5(10),8,14-pentaen-17-one (0.5 g.) in methanol (30 cc.) and add a slight excess of a solution of diazoethane in ether. Stir the mixture for 10 minutes, and decompose the excess diazoethane by the addition of acetic acid. Evaporate the reaction mixture to dryness, dissolve the residue in benzene, and filter through "Florex" (20 g.) with benzene. Evaporate the eluate to obtain 13β-ethyl-3-ethoxygona-1,3,5(10),8,14-pentaen-17-one; infrared absorption peak at 5.78μ; ultraviolet absorption peak at 312 mμ (ε27,200).

This compound has estrogenic activity, lowers the blood lipid level, and is useful as an intermediate for preparing the hormonal compounds of this invention.

*Example 89.—13β-ethyl-3-benzyloxygona-1,3,5(10),8,14-pentaen-17-one*

Treat 13β-ethyl-3-hydroxygona-1,3,5(10),8,14-pentaen-17-one (0.3 g.) in methanol (15 cc.) with an excess of an ethereal solution of phenyldiazomethane. Stir the solution for 3 hours and decompose the excess reagent by the addition of acetic acid. Evaporate the solution to dryness and take up the residue in ether; wash with saturated sodium bicarbonate solution and then water; dry and evaporate. Dissolve the product in benzene and filter through "Florisil" (25 g.); remove the eluate under reduced pressure to obtain 13β-ethyl-3-benzyloxygona-1,3,5(10),8,14-pentaen-17-one; ultraviolet absorption peaks at 310 mμ (ε27,000).

This compound has estrogenic activity, lowers the blood lipid level, and is useful as an intermediate for preparing the hormonal compounds of this invention.

*Example 90.—13-ethyl-3-hydroxygona-1,3,5(10),8,14-pentaen-17-one, potassium sulfate*

Add 1.22 g. sulfamic acid to a solution of 13-ethyl-3-hydroxygona-1,3,5(10),8,14-pentaen-17-one and heat the mixture with stirring under nitrogen at 90° for two hours. Cool, add to dry ether, decant the ether layer, take up the residual gum in 10 ml. pyridine and filter off the resulting white crystalline precipitate. Add to the filtrate 15 ml. of 10% aqueous potassium hydroxide, separate the upper organic layer, and evaporate to dryness in vacuo. Wash the residue with dry ether to leave 1.1 g. dark red powder. Recrystallize three times from methanolether to give the potassium salt (44 mg.), M.P. 227–230° d.; ultraviolet 319 mμ (ε6,550); 267 mμ (ε9,600).

*Example 91.—3-cyclopentyloxy-13-ethylgona-1,3,5(10),8,14-pentaen-17-one*

Treat 6-cyclopentyloxy-1-tetralone with vinyl magnesium bromide in tetrahydrofuran to obtain 1,2,3,4-tetrahydro-6-cyclopentyloxy-1-vinyl-1-naphthol, ultraviolet 277 mμ (ε2,920). Couple this compound with 2-ethyl-1,3-cyclopentanedione to obtain 3-cyclopentyloxy-13-ethyl-8,14-secogona-1,3,5(10),9(11)-tetraene-14,17-dione, ultraviolet 267 mμ (ε18,050). Cyclize with hydrogen chloride and methanol at 60° for 45 minutes to obtain a red gum, which, upon chromatography over "Florisil" with benzene and recrystallization from ethyl acetate-methanol, gave the title product as pale red needles, M.P. 93–96°, ultraviolet 313 mμ (ε30,900). This ketone is converted to its cyclic ethylene ketal, M.P. 102–106° from ethyl acetate-methanol, by treatment with ethylene glycol in the presence of p-toluenesulfonic acid after 24 hours reflux in benzene and toluene.

*Example 92.—13-ethylgona-1,3,5(10),8,14-pentaen-17-one*

Heat 5 g. 1-vinyltetralin-1-ol with potassium hydroxide and 2-ethylcyclopentane-1,3-dione at 150° for two and one-half hours under nitrogen to obtain 13-ethyl-8,14-secogona-1,3,5(10),9(11)-tetraene-14,17-dione, ultraviolet 257 mμ (ε14,500). Cyclize to the title product using polyphosphoric acid in benzene at room temperature for 40 minutes; ultraviolet 307 mμ (ε12,000), 296 mμ, and 322 mμ.

*Example 93.—13β-methyl-3-methoxygona-1,3,5(10),8,14-pentaen-17β-ol*

Dissolve 13β-methyl-3-methoxygona-1,3,5(10),8,14-pentaen-17-one (2.5 g.) in tetrahydrofuran (20 ml.) and ethanol (20 ml.) and treat with an excess of sodium borohydride (3.0 g.). Allow to stand for one hour. Add 500 ml. water and extract with ether. Wash, dry, and evaporate to leave 2.5 g. of a yellow gum, crystallized by rubbing with ether. Add hexane and filter off 1.85 g. product, M.P. 102–105°; infrared 2.82, 2.95, 6.24, 6.29, 6.41μ; ultraviolet 312 mμ (ε30,650).

$C_{19}H_{22}O_2$ Calculated: C, 80.18%; H, 7.85%. Found: C, 80.87%; H, 7.97%.

To prepare 7,13β-dimethyl-2-methoxygona-1,3,5(10),8,14-pentaen-17β-ol, treat 7,13β-dimethyl-3-methoxygona-1,3,5(10),8,14-pentaen-17-one with sodium borohydride according to the manipulative procedure described above.

To prepare 13β-methylgona-1,3,5(10),8,14-pentaene-3,17β-diol treat 13β-methyl-3-hydroxygona-1,3,5(10),8,14-pentaen-17-one with sodium borohydride according to the manipulative procedure described above.

To prepare 13β-ethyl-2,3-dimethoxygona-1,3,5(10),8,14-pentaen-17β-ol treat 13β-ethyl-2,3-dimethoxygona-1,3,5(10),8,14-pentaen-17-one with sodium borohydride according to the manipulative procedure described above.

To prepare 13β-isobutyl-3-pentyloxygona-1,3,5(10),8,14-pentaen-17β-ol treat 13β-isobutyl-3-pentyloxygona-1,3,5(10),8-14-pentaen-17-one with sodium borohydride according to the manipulative procedure described above.

To prepare 13β-(3-dimethylaminopropyl)-1,3-dimethoxygona-1,3,5(10),8,14-pentaen-17β-ol treat 13β-(3-dimethylaminopropyl)-1,3-dimethoxygona-1,3,5(10),8,14-pentaen-17-one with sodium borohydride according to the manipulative procedure described above.

These compounds have estrogenic activity, lower the blood lipid level, and are useful as intermediates in the preparation of the hormonal compounds of the invention.

*Example 94.—13β-ethyl-3-methoxygona-1,3,5(10),8,14-pentaen-17β-ol*

Treat 13β-ethyl-3-methoxygona-1,3,5(10),8,14-pentaen-17-one (8 g.) in ethanol (200 cc.) with a solution of sodium borohydride (1.4 g.) in ethanol (120 cc.), and stir the mixture at room temperature for 20 hours. Add 50% aqueous acetic acid (40 cc.) and evaporate the mixture to dryness under reduced pressure. Add water (300 cc.) to the residue, and extract the mixture with ether. Evaporate the washed and dried extracts and distil the residual oil at 170–210° (bath temp.)/0.0003 mm. to obtain 13β-ethyl-3-methoxygona-1,3,5(10),8,14-pentaen-17β-ol (5.8 g).

This compound has estrogenic activity, lowers the blood lipid level and is useful as an intermediate for preparing the hormonal compounds of this invention.

*Example 95.—3-methoxy-13-propylgona-1,3,5(10),8,14-pentaen-17β-ol*

Treat 3-methoxy-13-propylgona-1,3,5(10),8,14-pentaen-17-one (10 g.) in ethanol (250 cc.) with sodium borohydride (3.3 g.) in ethanol (280 cc.) in an atmosphere of nitrogen and stir for 20 hours. Acidify the solution to pH 6 with 50% aqueous acetic acid and remove the solvent under reduced pressure. Take up the residue in ether, wash with water, aqueous sodium hydrogen carbonate, and brine and dry. Remove the solvent and distil the residue at 200–230° to give the title product (5.8 g.).

$C_{21}H_{26}O_2$ Calculated: C, 81.25%; H, 8.44%. Found: C, 80.95%; H, 8.45%.

*Example 96.—13β-isopropyl-3-methoxygona-1,3,5(10),8,14-pentaen-17β-ol*

Reduce 13β-isopropyl-3-methoxygona-1,3,5,(10),8,14-pentaen-17-one exactly as described in the Example 94 to obtain 13β-isopropyl-3-methoxygona-1,3,5(10),8,14- pentaen-17β-ol as a gum; ultraviolet absorption peak at 312 mμ (ε25,800).

This compound has estrogenic activity, lowers the blood lipid level, and is useful as an intermediate for preparing the hormonal compounds of this invention.

*Example 97.—13butyl-3-methoxygona-1,3,5(10),8,14-pentaen-17β-ol*

Reflux 13-butyl-3-methoxygona-1,3,5(10),8,14-pentaen-17-one (32 g.) with 3.1 g. sodium borohydride in absolute alcohol to yield 29 g. (90%) of the title product; ultraviolet 313 mμ (ε26,800); infrared 2.80, 2.95μ.

$C_{22}H_{28}O_2$ Calculated: C, 81.44%; H, 8.70%. Found: C, 81.21%; H, 8.69%.

*Example 98.—13β-cetyl-3-methoxygona-1,3,5(10),8,14-pentaen-17β-ol*

To a solution of 13β - cetyl - 3 - methoxygona-1,3,5(10),8,14-pentaen-17-one (2.45 g.) in ethanol (65 cc.) add a solution of sodium borohydride (0.775 g.) in ethanol (65 cc.), and stir the mixture at room temperature for 30 minutes, then reflux for 3 hours and finally cool. Treat with aqueous acetic acid and work up to obtain a dark red gum (2.2 g.), which one takes up in a mixture of equal volumes of benzene and light petroleum ether and passes through a column of activated Fuller's earth (160 g.); elute with benzene; evaporate the eluate to obtain 13β - cetyl-3-methoxygona-1,3,5(10),8,14-pentaen-17β-ol as a yellow gum (1.2 g.); infrared absorption peak at 3.0 (hydroxyl), no band in the 5.71–5.88μ region. Ultraviolet absorption peak at 310 mμ (ε25,000).

$C_{34}H_{52}O_2$ Calculated: C, 82.85%; H, 10.65%. Found: C, 82.95%; H, 10.85%.

This compound has estrogenic activity, lowers the blood lipid level, and is useful as an intermediate for preparing the hormonal compounds of this invention.

*Example 99.—13-ethyl-3-methoxy-6-methylgona-1,3,5(10),8,14-pentaen-17β-ol*

Dissolve 0.4 g. 13 - ethyl - 3 - methoxy-6-methylgona-1,3,5(10),8,14-pentaen-17-one in 40 ml. methanol and add 0.4 g. sodium borohydride. After spontaneous reaction ceases, stir an additional one-half hour, pour into water, and extract with ether. Wash, dry, and evaporate the ether to obtain 0.35 g. of a residue which crystallizes. Recrystallize from 95% ethanol to obtain 0.1 g. of the title product, M.P. 92–94°; infrared 2.98μ; ultraviolet 312 mμ (ε30,000).

*Example 100.—13β-ethylgona-1,3,5(10),8,14-pentaene-3,17β-diol*

Reflux 13β - ethyl - 3-hydroxygona-1,3,5(10),8,14-pentaen-17-one (0.6 g.) in ethanol (30 cc.) with sodium borohydride (0.3 g.) for 30 minutes. Acidify the cooled solution with acetic acid and evaporate almost to dryness under reduced pressure. Add water, extract the product with ether, and wash, dry and evaporate the ethereal solution. Recrystallize the residue from chloroform to obtain 13β - ethylgona-1,3,5(10),8,14-pentaene-3,17β-diol, M.P. 135–136° C.; ultraviolet absorption peak at 310 mμ (ε20,000).

This compound has estrogenic activity, lowers the blood lipid level, and is useful as an intermediate for preparing the hormonal compounds of this invention.

*Example 101.—13β-propylgona-1,3,5(10),8,14-pentaene-3,17β-diol*

Reduce 13β-propyl-3-hydroxygona-1,3,5(10),8,14-pentaen-17-one (0.6 g.) exactly as described in the previous example to obtain 13β - propylgona-1,3,5(10),8,14-pentaene-3,17β-diol; ultraviolet absorption peak at 311 mμ (ε21,000).

This compound has estrogenic activity, lowers the blood lipid level, and is useful as an intermediate for preparing the hormonal compounds of this invention.

*Example 102.—13β-ethyl-3-ethoxygona-1,3,5(10),8,14-pentaen-17β-ol*

Reflux 13β-ethyl-3-ethoxygona-1,3,5(10),8,14-pentaen-17-one (0.3 g.) with sodium borohydride (0.1 g.) in ethanol (15 cc.) for 30 minutes. Acidify the cooled solution with acetic acid and evaporate almost to dryness. Add water and extract the product with ether. Wash, dry and evaporate the ethereal solution to obtain as residue 13β-ethyl-3-ethoxygona - 1,3,5(10),8,14 - pentaen-17β-ol as a gum; ultraviolet absorption peak at 312 mμ (ε27,600).

This compound has estrogenic activity, lowers the blood lipid level, and is useful as an intermediate for preparing the hormonal compounds of this invention.

*Example 103.—13β-ethyl-3-benzyloxygona-1,3,5(10),8,14-pentaen-17β-ol*

Reflux 13β-ethyl-3-benzyloxygona - 1,3,5(10),8,14-pentaen-17-one (0.5 g.) with sodium borohydride (0.15 g.) in ethanol (40 cc.) for 30 minutes. Acidify the cooled solution with acetic acid and evaporate almost to dryness under reduced pressure. Add water and extract the product with ether. Wash, dry and evaporate the ethereal solution to obtain as residue 13β-ethyl-3-benzyloxygona-1,3,5(10),8,14 - pentaen-17β-ol; ultraviolet absorption peak at 310 mμ (ε24,800).

This compound has estrogenic activity, lowers the blood lipid level, and is useful as an intermediate for preparing the hormonal compounds of this invention.

*Example 104.—17β-formyloxy-3-methoxy-13-methylgona-1,3,5(10),8,14-pentaene*

Treat 3 - methoxy-13 - methylgona - 1,3,5,(10),8,14-pentaen-17β-ol with formic acid in acetic anhydride to obtain the title product, M.P. 122–123° C.; ultraviolet 313 mμ (ε25,400); infrared 5.88μ.

*Example 105.—13-methyl-3-methoxy-17β-(l-menthoxyacetoxy)gona-1,3,5(10),8,14-pentaene*

Treat 1.0 g. 13-methyl-3-methoxygona-1,3,5(10),8,14-pentaen-17β-ol in 10 ml. pyridine with 1.23 g. l-menthoxyacetyl chloride and allow to stand at 0° for 20 hours. Pour into excess cold dil. hydrochloric acid and isolate by ether-extraction. Dissolve in benzene-hexane (1:1), percolate through "Florex" (30 g.) to obtain 1.35 g. of the title product, which crystallizes overnight at 0° in the presence of a trace of ether. Recrystallize four times from benzene-methanol to M.P. 94–96°; $[α]_D^{24}$=—54.1° (1% in CHCl₃); ultraviolet 312 mμ (ε31,600); infrared 5.72, 6.24, 6.4μ.

$C_{31}H_{42}O_4$ Calculated: C, 77.78%; H, 8.84%. Found: C, 78.04%; H, 9.13%.

*Example 106.—13β-ethyl-3,17β-dimethoxygona-1,3,5(10),8,14-pentaene*

Methylate 13β-ethyl-3 - methoxygona-1,3,5(10),8,14-pentaen-17β-ol (1.0 g.) in methylene chloride (50 cc.) containing one drop of boron trifluoride etherate with diazomethane (from N-nitrosomethylurea 2.05 g.) in methylene chloride (40 cc.). Work up to obtain a gum which one chromatographs on neutral alumina. Recrystallize the benzene-hexane (1:1)-eluted material from methanol-ethyl acetate to obtain 13β-ethyl-3,17β-dimethoxygona-1,3,5(10),8,14-pentaene (0.4 g.), M.P. 59–61°; infrared absorption peaks at 6.25μ, 6.41μ, and 6.45; ultraviolet absorption peak at 312 mμ (ε29,000).

$C_{21}H_{26}O_2$ Calculated: C, 81.25%; H, 8.4%. Found: C, 80.9%; H, 8.4%.

This compound has estrogenic activity, lowers the blood lipid level, and is useful as an intermediate for preparing the hormonal compounds of this invention.

Example 107.—13β-ethyl-3-methoxy-17β-acetoxygona-1,3,5(10),8,14-pentaene

To a solution of 13β-ethyl-3-methoxygona-1,3,5(10), 8,14-pentaen-17β-ol (2 g.) in pyridine (15 cc.) add acetic anhydride (15 cc.) and allow the mixture to stand at room temperature for 20 hours. After pouring into ice-water extract the mixture with ether. Wash the ether solution with hydrochloric acid, sodium bicarbonate, and water, and dry. After removal of the solvent, distil the residue at 0.05 mm. (185–195° bath temp.). Crystallize the distillate from methanol to obtain 13β-ethyl-3-methoxy-17β-acetoxygona-1,3,5(10),8,14-pentaene (1.1 g., 54.4%), M.P. 89–90°. Infrared absorption peaks at 5.75μ, 8.08μ.

$C_{22}H_{26}O_3$ Calculated: C, 78.0%; H, 7.7%. Found: C, 78.2%; H, 8.0%.

This compound has estrogenic activity, lowers the blood lipid level, and is useful as an intermediate for preparing the hormonal compounds of this invention.

Example 108.—13-ethyl-3-methoxy-17β-propionoxy-gona-1,3,5(10),8,14-pentaene

Treat 13-ethyl-3-methoxygona-1,3,5(10),8,14-pentaen-17β-ol with propionic anhydride in pyridine to obtain the title product, M.P. 64–68° C.; ultraviolet 312 mμ (ε32,000).

$C_{23}H_{28}O_3$ Calculated: C, 78.4%; H, 8.0%. Found: C, 79.0%; H, 7.7%.

Example 109.—13β-ethyl-3-methoxy-17β-benzoyloxy-gona-1,3,5(10),8,14-pentaene Add benzoyl chloride (2 g.) in benzene (10 cc.) to 13β-ethyl-3 - methoxygona-1,3,5(10),8,14-pentaen-17β-ol (2 g.) in pyridine (10 cc.) at 5°. Keep the mixture for 24 hours, then add to crushed ice and extract with ether. Evaporate the washed and dried extracts to obtain a residue. Recrystallize from 95% ethanol to obtain 13β-ethyl-3 - methoxy-17β-benzoyloxygona-1,3,5(10),8,14-pentaene, M.P. 99–101°.

$C_{27}H_{28}O_3$ Calculated: C, 81.0%; H, 7.05%. Found: C, 81.0%; H, 7.1%.

To prepare 13β-methyl-3-methoxy-17β-acetoxygona-1,3,5(10),8,14-pentaene treat 13β-methyl-3-methoxygona-1,3,5(10),8,14-pentaen-17β-ol with acetic anhydride according to the manipulative procedure described above.

To prepare 13β-methyl-3-methoxy-17β-benzoyloxygona-1,3,5(10),8,14-pentaene treat 13β-methyl-3-methoxygona-1,3,5(10),8,14-pentaen-17β-ol with benzoyl chloride according to the manipulative procedure described above.

These compounds have estrogenic activity, lower the blood lipid level, and are useful as intermediates in the preparation of the hormonal compounds of the invention.

Example 110.—13β-ethyl-3,17β-diacetoxygona-1,3,5(10),8,14-pentaene

Dissolve 13β-ethylgona-1,3,5(10),8,14-pentaene-3,17β-diol (1.02 g.) in pyridine (17.5 ml.) and acetic anhydride (10 cc.) and allow the mixture to stand at room temperature for 16 hours. Remove the solvent in vacuo, and take up the residue in ethanol and evaporate. Recrystallize from ethanol to obtain 13β-ethyl-3,17β-diacetoxygona-1,3,5(10),8,14-pentaene (685 mg.) M.P. 91–92°; infrared absorption peaks at 5.73μ, 5.88μ; ultraviolet absorption peak at 305 mμ (ε24,400).

$C_{23}H_{26}O_4$ Calculated: C, 75.38%; H, 7.15%. Found: C, 75.37%; H, 7.19%.

This compound has estrogenic activity, lowers the blood lipid level, and is useful as an intermediate for preparing the hormonal compounds of this invention.

Example 111.—13-ethyl-3,17β-dipropionoxygona-1,3,5(10),8,14-pentaene

Treat 13-ethylgona-1,3,5(10),8,14 - pentaene-3,17β-diol (1.0 g.) with pyridine (17 ml.) and propionic anhydride (10 ml.) and allow to stand overnight at room temperature. Evaporate and crystallize to obtain the title product.

Example 112.—13-ethyl-3-methoxygona-1,3,5(10),8,14-pentaen-17β-ol, l-menthoxyacetate Treat 13-ethyl - 3-methoxygona-1,3,5(10),8,14-pentaen-17-one in tetrahydrofuran with lithium tri-t-butoxyaluminohydride in tetrahydrofuran. Carry out the reduction and work up in conventional manner to obtain the 17β-alcohol. Treat this alcohol in pyridine with l-menthoxyacetyl chloride and work up to obtain the title product.

Example 113.—3,17β-dimethoxy-13-propylgona-1,3,5(10)8,14-pentaene

Treat 3-methoxy - 13 - propylgona - 1,3,5(10),8,14-pentaen-17β-ol with diazomethane in a Dry Ice-acetone bath to form the title product, M.P. 83–85° C.; ultraviolet 312 mμ (ε27,200).

Example 114.—13-ethylgona-1,3,5(10),8,14-pentaene-3,17β-diol, diphosphate

Treat 13-ethylgona - 1,3,5(10),8,14-pentaene-3,17β-diol in pyridine with phosphonyl chloride at −10° for one hour and work up conventionally to obtain the title product.

Example 115.—13β-propyl-3-methoxy-17β-acetoxygona-1,3,5(10),8,14-pentaene

Esterify 13β-propyl-3-methoxygona-1,3,5(10),8,14-pentaen-17β-ol (2 g.) with acetic anhydride to obtain a product which one recrystallizes from methanol to obtain 13β-propyl-3-methoxy - 17β - acetoxygona-1,3,5(10),8,14-pentaene (1.5 g.), M.P. 95–96°.

$C_{23}H_{28}O_3$ Calculated: C, 78.4%; H, 8.4%. Found: C, 78.2%; H, 7.8%.

This compound has estrogenic activity, lowers the blood lipid level and is useful as an intermediate for preparing the hormonal compounds of this invention.

Example 116.—13β-propyl-3-methoxy-17β-propionoxy-gona-1,3,5(10),8,14-pentaene Add propionic anhydride (15 cc.) to 13β-propyl-3-methoxygona-1,3,5(10),8,14-pentaene-17β-ol (2 g.) in pyridine (10 cc.) and keep the mixture at room temperature overnight, then pour onto crushed ice and extract with ether. Evaporate the washed and dried extracts to a residue. Recrystallize from methanol to obtain 13β-propyl-3-methoxy - 17β - propionoxygona-1,3,5(10),8,14-pentaene (1.3 g.), M.P. 104°.

$C_{24}H_{30}O_3$ Calculated: C, 78.65%; H, 8.25%. Found: C, 78.85%; H, 8.3%.

This compound has estrogenic activity, lowers the blood lipid level, and is useful as an intermediate for preparing the hormonal compounds of this invention.

Example 117.—13β-propyl-3-methoxy-17β-benzoyloxy-gona-1,3,5(10),8,14-pentaene Esterify 13β-propyl-3-methoxygona-1,3,5(10),8,14-pentaen-17β-ol (1.0 g.) with benzoyl chloride to obtain a product which on recrystallization from 95% ethanol gives 13β-propyl - 3 - methoxy - 17β - benzoyloxygona-1,3,5(10),8,14-pentaene.

$C_{28}H_{30}O_3$ Calculated: C, 81.1%; H, 7.3%. Found: C, 81.0%; H, 7.2%.

This compound has estrogenic activity, lowers the blood lipid level, and is useful as an intermediate for preparing the hormonal compounds of this invention.

Example 118.—13β-ethyl-3,17β-dibenzoyloxygona-1,3,5(10),8,14-pentaene

Dissolve 13β-ethylgona-1,3,5(10),8,14-pentaene-3,17β-diol (0.35 g.) in pyridine (5 cc.) and benzoyl chloride (1.0 ml.) and allow the solution to stand at room temperature for 48 hours. Add water and extract the mixture with ether. Wash the ethereal solution with water, 10% aqueous potassium hydroxide, water, 10% hydrochloric acid, and brine, and dry. Evaporate the solvent and filter the residue through alumina (20 g.) with benzene. Evaporate the solvent and crystallize the residue from ethanol to obtain 13β-ethyl-3,17β-dibenzoyloxygona-1,3,5(10),8,14-pentaene; ultraviolet absorption peak at 304 mμ (ε26,000).

This compound has estrogenic activity, lowers the blood lipid level and is useful as an intermediate for preparing the hormonal compounds of this invention.

*Example 119.—13β-ethyl-3-ethoxy-17β-acetoxygona-1,3,5(10),8,14-pentaene*

Dissolve 13β-ethyl - 3 - ethoxygona-1,3,5(10),8,14-pentaen-17β-ol (0.5 g.) in pyridine (3 cc.) and acetic anhydride (3 cc.) and allow the mixture to stand at room temperature for 15 hours. Remove the solvent in vacuo and extract the product with ether. Wash, dry, and evaporate the ethereal solution and recrystallize the residue from methanol to obtain 13β-ethyl-3-ethoxy-17β-acetoxygona-1,3,5(10),8,14-pentaene; ultraviolet absorption peak at 311 mμ (ε27,400).

This compound has estrogenic activity, lowers the blood lipid level, and is useful as an intermediate for preparing the hormonal compounds of this invention.

*Example 120.—13β-ethyl-3-ethoxy-17β-benzoyloxygona-1,3,5(10),8,14-pentaene*

Dissolve 13β-ethyl - 3 - ethoxygona-1,3,5(10),8,14- pentaen-17β-ol (0.2 g.) in pyridine (4 cc.) and benzoyl chloride (0.75 cc.) and allow the mixture to stand at room temperature for 24 hours. Add water (10 cc.) and stir the mixture for a further hour. Add more water and extract the product with ether. Wash, dry and evaporate the ethereal solution and crystallize the residue from ethanol to obtain 13β - ethyl - 3 - ethoxy-17β-benzoyloxygona-1,3,5(10),8,14-pentaene; ultraviolet absorption peak at 312 mμ (ε25,000).

This compound has estrogenic activity, lowers the blood lipid level, and is useful as an intermediate for preparing the hormonal compounds of this invention.

*Example 121.—13β-ethyl-3-benzyloxy-17β-acetoxygona-1,3,5(10),8,14-pentaene*

Dissolve 13β-ethyl - 3 - benzyloxygona-1,3,5(10),8,14-pentaen-17β-ol (0.1 g.) in pyridine (0.5 cc.) and acetic anhydride (0.5 cc.) and allow the mixture to stand at room temperature for 16 hours. Remove the solvent in vacuo and extract the product with ether. Wash, dry and evaporate the ethereal solution, recrystallize the residue from methanol to obtain 13β-ethyl-3-benzyloxy-17β-acetoxygona-1,3,5(10),8,14-pentaene; ultraviolet absorption peak at 310 mμ (ε25,300).

This compound has estrogenic activity, lowers the blood lipid level, and is useful as an intermediate for preparing the homonal compounds of this invention.

*Example 122.—13β-ethyl-3-benzyloxy-17β-benzoyloxygona-1,3,5(10),8,14-pentaene*

Dissolve 13β-ethyl - 3 - benzyloxygona-1,3,5(10),8,14-pentaen-17β-ol (0.1 g.) in pyridine (2 cc.) and benzoyl chloride (0.55 cc.) and allow the mixture to stand at room temperature for 24 hours. Add water (20 cc.) and stir the mixture for a further hour. Extract the product with ether and wash, dry and evaporate the ethereal solution. Filter through "Florisil" (10 g.) with benzene. Evaporate the solvent and recrystallize the residue from methanol to obtain 13β-ethyl-3-benzyloxy-17β-benzoyloxygona-1,3,5(10),8,14-pentaene; ultraviolet absorption peak at 310 mμ (ε24,800).

This compound possesses estrogenic and blood lipid lowering activity and is useful as an intermediate for preparing the hormonal compounds of this invention.

*Example 123.—13β-methyl-3-methoxy-17a,17a-ethylenedioxy-D-homogona-1,3,5(10),8,14-pentaene*

Reflux 13β-methyl-3-methoxy-D-homogona-1,3,5(10), 8,14-pentaen-17a-one (0.3 g.) in benzene (20 cc.) containing ethylene glycol (1 cc.) and anhydrous toluene-p-sulfonic acid (0.05 g.) for 18 hours using a Dean-Stark trap. Isolate the product to obtain a gum which is dissolved in benzene (2 cc.), wash through alumina (25 g.) with light petroleum containing 20% benzene. Evaporate the solvent to obtain a solid; recrystallize from light petroleum containing a little ether to obtain 13β-methyl-3-methoxy - 17a,17a - ethylenedioxy - D - homogona - 1,3, 5(10),8,14-pentaene (0.145 g.), M.P. 123–126°; ultraviolet absorption peak at 311 mμ (ε24,000); no ketone absorption in the infrared.

To prepare 13β-isobutyl-3-methoxy-17,17-ethylenedioxygona - 1,3,5(10),8,14 - pentaene treat 13β - isobutyl-3 - methoxygona - 1,3,5(10),8,14 - pentaen - 17 - one with anhydrous toluene-p-sulfonic acid, ethylene glycol, and benzene according to the manipulative procedure described above.

To prepare 13β - methyl - 3 - methoxy - 17,17 - ethylenedioxygona-1,3,5(10),8,14-pentaene treat 13β-methyl-3-methoxygona-1,3,5(10),8,14-pentaen-17-one with anhydrous toluene-p-sulfonic acid, ethylene glycol, and benzene according to the manipulative procedure described above.

To prepare 13β-ethyl-1,3-dimethoxy-17,17-ethylenedioxygona - 1,3,5(10),8,14 - pentaene treat 13β - ethyl - 1,3-dimethoxygona-1,3,5(10),8,14-pentaen-17-one with anhydrous toluene-p-sulfonic acid, ethylene glycol, and benzene according to the manipulative procedure described above.

To prepare 13β-phenethyl-3-propoxy-17,17-ethylenedioxygona-1,3,5(10),8,14-pentaene treat 13β-phenethyl-3-propoxygona-1,3,5(10),8,14-pentaen-17-one with anhydrous toluene-p-sulfonic acid, ethylene glycol, and benzene according to the manipulative procedure described above.

To prepare 13β-(3-hydroxypropyl)-3-cyclopentyloxy-17,17 - ethylenedioxygona - 1,3,5(10),8,14 - pentaene treat 13β - (3 - hydroxypropyl) - 3 - cyclopentyloxygona-1,3,5(10),8,14-pentaen-17-one with anhydrous toluene-p-sulfonic acid, ethylene glycol, and benzene according to the manipulative procedure described above.

These compounds have estrogenic activity, lower the blood lipid level, and are useful as intermediates in the preparation of the hormonal compounds of the invention.

*Example 124.—13β-methyl-3-methoxy-17,17-ethylenedioxygona-1,3,5(10),8,14-pentaene*

Reflux 13β - methyl - 3 - methoxygona - 1,3,5(10),8, 14-pentaen-17-one (5.0 g.) in benzene (560 cc.) containing ethylene glycol (50 cc.) and anhydrous toluene-p-sulfonic acid (from the monhydrate, 1.6 g.) for 19 hours using a Dean-Stark trap to remove the water formed. Wash the cooled mixture to remove acid, dry and evaporate the solvent to obtain a pink gum; crystallize the gum from ethanol to obtain 13β-methyl-3-methoxy-17,17-ethylenedioxygona-1,3,5(10),8,14-pentaene (4.7 g.) M.P. 94–97°. High vacuum distillation of a sample of the ketal and recrystallization of the distillate from ethanol gives material, M.P. 93–95.5°; ultraviolet absorption peak at 310 mμ (ε31,000); no infrared band in the 5.71–5.88μ region.

$C_{21}H_{24}O_3$ Calculated: C, 77.8; H, 7.5%. Found: C, 77.7; H, 7.2%.

This compound has estrogenic activity, lowers the blood lipid level, and is useful as an intermediate for preparing the hormonal compounds of this invention.

*Example 125.—13β-methyl-3-methoxy-17,17-propylenedioxygona-1,3,5(10),8,14-pentaene*

Reflux 13β-methyl-3-methoxygona-1,3,5(10),8,14-pentaen-17-one (3.0 g.) in benzene (550 cc.) containing propane-1,3-diol (50 cc.) and anhydrous toluene-p-sulfonic acid (from the monohydrate, 0.96 g.) for 19 hours using a Dean-Stark trap. Isolate the product to obtain a material which one recrystallizes from methanol to obtain 13β - methyl - 3 - methoxy - 17,17 - propylenedioxygona-1,3,5(10),8,14-pentaene (0.85 g.), M.P. 127–137°; a portion sublimes at 110°/10⁻³ mm. to give the purified ketal, M.P. 136–141°; ultraviolet absorption peak at 310 mμ ($\epsilon$27,900); no infrared band in the 5.71–5.88μ region.

$C_{22}H_{26}O_3$ Calculated: C, 78.1%; H, 7.7%. Found: C, 78.0%; H, 7.7%.

This compound has estrogenic activity, lowers the blood lipid level, and is useful as an intermediate for preparing the hormonal compounds of this invention.

*Example 126.—13β-methyl-3-methoxy-17,17-(2,2-dimethylpropylenedioxy)gona-1,3,5(10),8,14-pentaene*

Reflux 13β-methyl-3-methoxygona-1,3,5(10),8,14 - pentaen-17-one (3.0 g) in benzene (560 cc.) containing 2,2-dimethylpropane-1,3-diol (10.4 g.) and anhydrous toluene-p-sulfonic acid (from the monhydrate, 0.96 g.) for 19 hours using a Dean-Stark trap. Isolate the product to obtain a material which one recrystallizes from methanol containing a small proportion of acetone, to obtain 13β-methyl-3-methoxy-17,17-(2,2-dimethylpropylenedioxy)gona-1,3,5(10),8,14-pentaene (2.44 g.), M.P. 115–117°; ultraviolet peak at 311 mμ ($\epsilon$29,900); no infrared band in the 5.71–5.88μ region.

$C_{24}H_{30}O_3$ Calculated: C, 78.65%; H, 8.25%. Found: C, 78.5%; H, 8.4%.

This compound has estrogenic activity, lowers the blood lipid level, and is useful as an intermediate for preparing the hormonal compounds of this invention.

*Example 127.—13β-ethyl-3-methoxy-17,17-ethylenedioxy-gona-1,3,5(10),8,14-pentaene*

Add a solution of 2-ethyl-2-(6-m-methoxyphenyl-3-oxohexyl)-1,3-cyclopentanedione (3.8 g.) in benzene (25 cc.) to a mixture of anhydrous toluene-p-sulfonic acid (1 g.) and benzene (50 cc.) and reflux the mixture for 1 hour using a Dean-Stark trap. Add ethylene glycol (26 cc.) and benzene (150 cc.) and continue refluxing for 20 hours. Wash the cooled product to remove acid, dry and evaporate. Treat the residual oil with a mixture of ether (30 cc.) and hexane (10 cc.), induce crystallization; filter off the crystalline product and distil (bath temp. 190°/0.0002 mm.). Crystallize the distillate from ethanol (20 cc.) to obtain the ketal 13β-ethyl-3-methoxy-17,17-ethylenedioxygona-1,3,5(10),8,14-pentaene (0.9 g.), M.P. 127°; ultraviolet absorption peak at 312 mμ ($\epsilon$ 31,200); no infrared band in the 5.71–5.88μ region.

$C_{22}H_{26}O_3$ Calculated: C, 78.05%; H, 7.75%. Found: C, 78.0%; H, 7.75%.

This compound has estrogenic activity, lowers the blood lipid level, and is useful as an intermediate for preparing the hormonal compounds of this invention.

*Example 128.—13β-ethyl-3-methoxy-17,17-ethylenedioxy-gona-1,3,5(10),8,14-pentaene*

Add a solution of 2-ethyl-2-(6-m-methoxyphenyl-3-oxohexyl)-1,3-cyclopentanedione (11.4 g.) in dry benzene (150 cc.) to a mixture of anhydrous toluene-p-sulfonic acid (14.4 g.) and dry benzene (350 cc.) and stir the mixture for 1 hour at room temperature. Add ethylene glycol (78 cc.) and reflux the mixture for 16 hours; wash the cooled product to remove acid, dry and evaporate to obtain an oil which one then distils (bath temp. 190°/0.0002 mm.). Crystallize the distillate from ethanol to obtain the ketal 13β-ethyl-3 - methoxy - 17,17 - ethylenedioxygona - 1,3,5(10),8,14-pentaene, M.P. 125°.

This compound has estrogenic activity, lowers the blood lipid level, and is useful as an intermediate for preparing the hormonal compounds of this invention.

*Example 129.—13β-ethyl-3-methoxy-17,17-ethylenedioxy-gona-1,3,5(10),8,14-pentaene*

Reflux a mixture of benzene (1560 cc.), ethylene glycol (345 cc.), and toluene-p-sulfonic acid monohydrate (16.0 g.) using a Dean-Stark trap, until no more water is collected. Cool the solution to room temperature and rapidly add 13β-ethyl - 3 - methoxygona-1,3,5(10),8,14-pentaen-17-one (50 g.) in benzene (660 cc.) to the vigorously stirred mixture in an atmosphere of nitrogen. Continue vigorous stirring while refluxing the mixture for 20 hours. Separate the excess ethylene glycol layer from the cooled mixture and wash the benzene layer, first with aqueous sodium carbonate and then with brine, and dry over anhydrous magnesium sulfate. Evaporate the filtered solution and distil the residue at 210–220°/0.006 mm., to obtain a gum which crystallizes from ethanol to obtain the ethylene ketal (42.2 g.), M.P. 125–127°.

This compound has estrogenic activity, lowers the blood lipid level, and is useful as an intermediate for preparing the hormonal compounds of this invention.

*Example 130.—13β-ethyl-3-methoxy-17,17-(2,2-dimethyl-propylenedioxy)gona-1,3,5(10),8,14-pentaene*

Reflux 13β - ethyl-3-methoxygona-1,3,5(10),8,14-pentaen-17-one (3.0 g.) in benzene (600 cc.) containing 2,2-dimethylpropane-1,3-diol (10.4 g.) and anhydrous toluene-p-sulfonic acid (from the monohydrate, 0.96 g.) for 18 hours and isolate product as in the previous example. Crystallize the product from methanol containing a small proportion of acetone to obtain the title product (2.13 g.), M.P. 97–100°; ultraviolet absorption peak at 311 mμ ($\epsilon$ 29,400); no infrared band in the 5.71–5.88μ region.

$C_{25}H_{32}O_3$ Calculated: C, 78.9%; H, 8.5%. Found: C, 78.7%; H, 8.6%.

This compound has estrogenic activity, lowers the blood lipid level, and is useful as an intermediate for preparing the hormonal compounds of this invention.

*Example 131.—13β-propyl-3-methoxy-17,17-ethylenedi-oxygona-1,3,5(10),8,14-pentaene*

Reflux 13β-propyl-3-methoxygona-1,3,5(10),8,14-pentaen-17-one (5.0 g.) in benzene (100 cc.), anhydrous toluene-p-sulfonic acid (from the monohydrate, 1.6 g.) and ethylene glycol (50 cc.) for 19 hours using a Dean-Stark trap. Separate the ethylene glycol layer, wash the benzene layer free of acid, dry and evaporate; crystallize the residue from methanol, then from a mixture of methanol (30 cc.) and ethyl acetate (5 cc.) with charcoaling; crystallize the product (2.6 g.) from a mixture of acetone (5 cc.) and methanol (25 cc.) to obtain the title product (2.3 g.), M.P. 106–108°; ultraviolet absorption peak at 310 mμ ($\epsilon$ 29,200); no infrared band in the 5.56–6.25 region.

$C_{23}H_{28}O_3$ Calculated: C, 78.4%; H, 8.0%; Found: C, 78.4%; H, 7.7%.

This compound has estrogenic activity, lowers the blood lipid level, and is useful as an intermediate for preparing the hormonal compounds of this invention.

*Example 132.—13β-propyl-3-methoxy-17,17-ethylenedi-oxygona-1,3,5(10),8,14-pentaene*

Stir a solution of 2-propyl-2-(6-m-methoxyphenyl-3-oxohexyl)-cyclopentane-1,3-dione (10.0 g.) in benzene (460 cc.), containing anhydrous toluene-p-sulfonic acid (from the monohydrate, 12.6 g.) for 1½ hours at room temperature; add ethylene glycol (68 cc.) and reflux the mixture for 19 hours using a Dean-Stark trap. Separate the ethylene glycol layer and wash the benzene layer to remove acid; dry and evaporate the benzene, distil the residue to obtain a gum, B.P. 170–230°/10⁻⁴ mm., crystallize from a mixture of acetone (10 cc.) and methanol (40 cc.), to obtain the title product (4.2 g.), M.P. 104–106°.

This compound has estrogenic activity, lowers the blood lipid level, and is useful as an intermediate for preparing the hormonal compounds of this invention.

*Example 133.—13β-butyl-3-methoxy-17,17-ethylenedioxygona-1,3,5(10),8,14-pentaene*

Carry out the reaction as in the previous example but use the corresponding trione having a 2-butyl group (10.0 g.). Isolate the product as before to obtain on evaporation a gum which one crystallizes from methanol containing a small proportion of acetone to obtain a material (1.8 g.), M.P. 85–90°, with infrared showing ketone impurity. Remove ketone by heating with pyridine and a little hydroxylamine hydrochloride; remove the pyridine by evaporation, dilute with benzene and chromatograph on neutral alumina. Elute with benzene and recrystallize from methanol to obtain the title product (0.8 g.), M.P. 94–97°; ultraviolet absorption peak at 311 mμ (ε28,700); no infrared band in the 5.71–5.88μ region.

$C_{24}H_{30}O_3$ Calculated: C, 78.65%; H, 8.25%. Found: C, 78.8%; H, 8.0%.

This compound has estrogenic activity, lowers the blood lipid level, and is useful as an intermediate for preparing the hormonal compounds of this invention.

*Example 134.—13β-cetyl-3-methoxy-17,17-ethylenedioxygona-1,3,5(10),8,14-pentaene*

Add a solution of 13β-cetyl-3-methoxygona-1,3,5(10), 8,14-pentaen-17-one (2.5 g.) in benzene (50 cc.) to a mixture of anhydrous toluene-p-sulfonic acid (from the monohydrate, 2.5 g.), ethylene glycol (25 cc.) and benzene (150 cc.). Reflux the mixture for 14 hours, and wash the cooled product to remove acid; dry and evaporate. Take up the resulting gum in benzene and pass through activated Fuller's earth to remove impurity. Remove traces of ketonic material by heating the evaporated product for 30 minutes with a small amount of pyridine and hydroxylamine hydrochloride, followed by dilution with benzene (20 cc.) and filtration through an activated Fuller's earth. Evaporate the solvent to obtain the title product (2.2 g.), as a colorless gum; ultraviolet absorption peak at 310 mμ (ε26,400); no infrared band in the 5.71–5.88μ region.

$C_{36}H_{54}O_3$ Calculated: C, 80.85%; H, 10.1%. Found: C, 81.12%; H, 10.1%.

This compound is useful as an intermediate for preparing the hormonal compounds of this invention.

*Example 135.—13-ethyl-3-methoxy-6-methyl-17,17-ethylenedioxygona-1,3,5(10),8,14-pentaene*

Reflux 39.7 g. 2-ethyl-2-(6-m-methoxyphenyl-3-oxoheptyl)-cyclopentane-1,3-dione in 500 ml. benzene with 11 g. p-toluenesulfonic acid hydrate. After removal of two moles of water, add 50 ml. ethylene glycol and reflux overnight. Work up to obtain 16.8 g. of the title product, M.P. 116–119°, by repeated filtration through "Florex" in hexane followed by repeated crystallization from ethanol. An analytical sample melts at 120–122°; ultraviolet 312 mμ (ε31,000).

*Example 136.—13-ethyl-3-methoxy-7-methyl-17,17-ethylenedioxygona-1,3,5(10),8,14-pentaene*

Reflux overnight a mixture of 2 g. 13-ethyl-3-methoxy-7-methylgona-1,3,5(10),8,14-pentaen-17-one, 0.4 g. p-toluenesulfonic acid hydrate, and 30 ml. ethylene glycol in 300 ml. benzene using a Dean-Stark water separator. Cool, wash with saturated aqueous sodium bicarbonate, water, and brine, dry, and evaporate to obtain a brown oil. Take up in a few ml. of methanol and place in a Dry Ice-acetone bath to crystallize. Recrystallize from methanol to obtain white crystals, M.P. 126.5–129°; ultraviolet 313 mμ (ε30,400).

The subject matter which the applicants regard as their invention is particularly pointed out and distinctly claimed as follows:

1. A chemical compound having the dialkylamino-6-phenyl-2-hexyne nucleus, methylene in the 1- and 4-positions of the hexyne chain, hydrogen in one of the ortho positions of the phenyl ring, and wherein said phenyl ring bears a para-directing substituent.

2. A chemical compound having the dialkylamino-6-phenyl-3-hexanone nucleus, methylene in the 1-, 2-, and 4-positions of the hexane chain, hydrogen in one of the ortho positions of the phenyl ring, and wherein said phenyl ring bears a para-directing substituent.

3. A chemical compound having the phenyl-1-hexen-3-one nucleus unsubstituted in the 1-position of the hexene chain, methylene in the 4-position of the hexene chain, hydrogen in one of the ortho positions of the phenyl ring, and wherein said phenyl ring bears a para-directing substituent.

4. A chemical compound having the 2-(6-phenyl-3-oxohexyl) - 1,3 - cyclopentanedione nucleus, said nucleus having attached thereto, in the 2-position, a polycarbonalkyl radical methylene in the 1-, 2-, and 4-positions of the hexyl chain, hydrogen in one of the ortho positions of the phenyl ring, and wherein said phenyl ring bears a para-directing substituent.

5. A chemical compound having the gona-1,3,5(10), 8,14-pentaene nucleus, said nucleus having attached thereto, in the 13-position, a polycarbon-alkyl radical.

6. A process for preparing a compound having a 2-(6-phenyl-3-oxohexyl)-1,3-cyclopentanedione nucleus, comprising: condensing a substrate compound having a 6-phenyl-1-hexen-3-one nucleus unsubstituted at the 1-position, with a nucleophilic compound having a 1,3-dioxocycloaliphatic nucleus substituted with at least one hydrogen in the 2-position, under Michael reaction conditions, whereby the nucleus of said nucleophilic compound is attached through its 2-position carbon to the 1-position carbon of the nucleus of said substrate compound.

7. A process for preparing a compound having a 2-(6-phenyl-3-oxohexyl)-1,3-cyclopentanedione nucleus, comprising: condensing under Michael reaction conditions a substrate compound convertible to a 6-phenyl-1-hexen-3-one nucleus unsubstituted at the 1-position, with a nucleophilic compound having a 1,3-dioxocycloaliphatic nucleus substituted by at least one hydrogen in the 2-position, whereby the nucleus of said nucleophilic compound is attached through its 2-position carbon to the 1-position carbon of the nucleus of said converted 6-phenyl-1-hexen-3-one.

8. A process for preparing a compound having a tetracyclic nucleus, comprising: treating a compound having a 3-(6-phenyl-3-oxohexyl)-1,3-cyclopentanedione nucleus, the phenyl group of said nucleus having at least one ortho-para directing substituent group and at least one position ortho to the position of chain attachment free of substituent groups, with a catalytic amount of a dehydrating acid to effect a cyclodehydation.

9. 13β-methyl - 3 - methoxygona - 1,3,5(10),8,14-pentaen-17-one.

10. 13β-ethyl-3-methoxygona - 1,3,5(10),8,14-pentaen-17-one.

11. 13β-methyl - 3 - methoxygona-1,3,5(10),8,14-pentaen-17β-ol.

12. 13β-ethyl-3-methoxygona - 1,3,5(10),8,14-pentaen-17β-ol.

13. 13β - methyl - 3 - hydroxygona-1,3,5(10),8,14-pentaen-17-one.

14. 13β-ethyl-3-hydroxygona - 1,3,5(10),8,14-pentaen-17-one.

15. 13β-propyl - 3 - methoxygona - 1,3,5(10),8,14-pentaen-17-one.

References Cited by the Examiner

UNITED STATES PATENTS

| | | | |
|---|---|---|---|
| 2,811,558 | 10/57 | Sannie et al. | 260—586 |
| 2,835,676 | 5/58 | Sprague et al. | 260—294.7 |
| 2,897,236 | 7/59 | Moss | 260—570.5 |

LEWIS GOTTS, *Primary Examiner.*